(12) United States Patent
Kanga et al.

(10) Patent No.: US 12,071,354 B2
(45) Date of Patent: Aug. 27, 2024

(54) MULTIFUNCTIONAL CO-ORDINATION FRAMEWORK MATERIALS

(71) Applicant: RUX TECHNOLOGY PTY LTD, Sydney (AU)

(72) Inventors: Jehan Rux Rustom Kanga, Gordon (AU); Cameron John Kepert, Camperdown (AU)

(73) Assignee: RUX TECHNOLOGY PTY LTD, Sydney (AU)

( * ) Notice: Subject to any disclaimer, the term of this patent is extended or adjusted under 35 U.S.C. 154(b) by 870 days.

(21) Appl. No.: 17/046,947

(22) PCT Filed: Apr. 12, 2019

(86) PCT No.: PCT/AU2019/050330
§ 371 (c)(1),
(2) Date: Oct. 12, 2020

(87) PCT Pub. No.: WO2019/195894
PCT Pub. Date: Oct. 17, 2019

(65) Prior Publication Data
US 2021/0046448 A1    Feb. 18, 2021

(30) Foreign Application Priority Data
Apr. 13, 2018    (AU) .............................. 2018901246

(51) Int. Cl.
*C01C 3/11*      (2006.01)
*B01J 20/22*    (2006.01)
(Continued)

(52) U.S. Cl.
CPC ............... *C01C 3/11* (2013.01); *B01J 20/226* (2013.01); *C01C 3/12* (2013.01); *C07F 15/0053* (2013.01);
(Continued)

(58) Field of Classification Search
None
See application file for complete search history.

(56) References Cited

U.S. PATENT DOCUMENTS

2017/0096348 A1* 4/2017 Takahashi ................. C01C 3/11

FOREIGN PATENT DOCUMENTS

| EP | 1873117 A1 | 1/2008 |
| JP | 2012006834 A | 1/2012 |
| WO | 2012108856 A1 | 8/2012 |

OTHER PUBLICATIONS

Behera, Jogendra N et al., "Synthesis and Characterization of Ruthenium and Iron-Ruthenium Prussian Blue Analogues", Chem. Mater., 2009, 21, pp. 1922-1926. (Year: 2009).*

(Continued)

*Primary Examiner* — Jason M Greene
(74) *Attorney, Agent, or Firm* — McKee, Voorhees & Sease, PLC

(57) ABSTRACT

Disclosed herein is a class of co-ordination framework materials having various useful properties. The co-ordination frameworks comprise complexes of $M_2[M'(CN)_6]$ or $A_x(M_2[M'(CN)_6])$, wherein M is selected from V, Cr, Mn, Fe, Co, Ni, Cu, Ag, Au, Zn, Ru, Rh, Pd and Pt; M' is selected from Fe and Ru; A (when present) is located in the pores of the framework and is selected from $Li^+$, $Na^+$, $K^+$, $Be^{2+}$, $Mg^{2+}$ and $Ca^{2+}$; and x (when present) is $0<x\leq 8$. Also disclosed are methods of making said materials and various uses of said materials.

17 Claims, 13 Drawing Sheets

(51) Int. Cl.
    *C01B 3/00*     (2006.01)
    *C01C 3/12*     (2006.01)
    *C07F 15/00*     (2006.01)
    *C07F 15/02*     (2006.01)
    *C07F 15/04*     (2006.01)
    *C07F 15/06*     (2006.01)

(52) U.S. Cl.
    CPC .......... *C07F 15/025* (2013.01); *C07F 15/045* (2013.01); *C07F 15/065* (2013.01); *C01B 3/001* (2013.01)

(56) References Cited

OTHER PUBLICATIONS

European Search Report for Application No. 19785988.7 dated Dec. 8, 2021 (7 pages).
Garnier et al., "Zeolite Iron Cyanides: The Structure of Na2Zn3[Fe(CN)6]2.H20", Acta Cryst., 1982, B38, pp. 1401-1405.
Gravereau et al., "Structure de la Phase Cubique de l'Hexacyanoferrate(III) de Zinc: Zn3[Fe(CN)6]2.nH20", Acta Crst., 1984, C40, pp. 1306-1309.
Li et al., "Facile Method To Synthesize Na-Enriched Na1+xFeFe(CN)6 Frameworks as Cathode with Superior Electrochemical Performance for Sodium-Ion Batteries", Chemistry of Materials, 2015, vol. 27, pp. 1997-2003.
International Search Report and Written Opinion for Application No. PCT/AU2019/050330 dated Jun. 24, 2019 (10 pages).
Zakaria et al., "Nanoporous Mn-based electrocatalysts through thermal conversion of cyano-bridged coordination polymers toward ultra-high efficiency hydrogen peroxide production", Journal of Materials Chemistry A, vol. 4, 2016, pp. 9266-9274.
Avila et al., "Porous framework of T2[Fe(CN)6] * H20 with T=Co, Ni, Cu, Zn, and H2 Storage", Journal of Solid State Chemistry, vol. 181, 2008, pp. 2899-2907.
Onija et al., "An Inverse Gas Chromatography Study of the Adsorption of Organics on Nickel- and Copper-Hexacyanoferrates at Zero Surface Coverage", Journal of Colloid and Interface Science, vol. 251, 2002, pp. 10-17.
Wessells et al., "The Effect of Insertion Species on Nanostructured Open Framework Hexacyanoferrate Battery Electrodes", Journal of the Electrochemical Society, vol. 159, No. 2, 2012, pp. A98-A103.
Martinez-Garcia et al., "Crystal structures of some manganese (II) and cadmium hexacyanoferrates (II, III) and structural transformations related to the sorption of Cesium", Powder Diffraction, vol. 19, No. 3, 2004, pp. 255-264.
English Translation of Japanese Patent Office Notice of Reasons for Rejection for Application No. 2021-504550 dated Apr. 5, 2022 (5 pages).
Behera et al., "Synthesis and Characterization of Ruthenium and Iron-Ruthenium Prussian Blue Analogues", Chem. Mater., 2009, vol. 21, pp. 1922-1926.

* cited by examiner

MULTIFUNCTIONAL CO-ORDINATION FRAMEWORK MATERIALS

FIELD OF THE INVENTION

The present invention relates to a class of multifunctional co-ordination framework materials, methods of making said materials and the use thereof.

BACKGROUND

The past decade has seen significant growth in the field of co-ordination frameworks owing to their enormous structural and chemical diversity. The majority of frameworks reported in the literature contain first-row transition metals. Examples of frameworks containing second-row transition metals are rare, largely owing to their relative inertness to ligand substitution.

SUMMARY OF THE INVENTION

In a first aspect, the present invention provides a co-ordination framework comprising complexes of Formula (I)

$$M_2[M'(CN)_6] \qquad \text{Formula (I)}$$

wherein

M is selected from V, Cr, Mn, Fe, Co, Ni, Cu, Ag, Au, Zn, Ru, Rh, Pd and Pt, especially Cr, Mn, Fe, Co, Ni, Cu, Zn, Ru and Rh; and M' is selected from Fe and Ru;

provided that when and M' is Fe, M is not Mn, Co, Ni, Cu or Fe.

In some embodiments, the co-ordination framework comprising complexes of Formula (I) is a co-ordination framework comprising complexes of Formula (II)

$$A_x(M_2[M'(CN)_6]) \qquad \text{Formula (II)}$$

wherein A is selected from Li$^+$, Na$^+$, K$^+$, Be$^{2+}$, Mg$^{2+}$ and Ca$^{2+}$, especially Li$^+$, Na$^+$ and K$^+$, M and M' are as defined above in the first aspect, 0<x≤8, and A is located in the pores of the framework.

In a second aspect, the present invention provides a highly crystalline co-ordination framework comprising complexes of Formula (III)

$$M_2[M'(CN)_6] \qquad \text{Formula (III)}$$

wherein

M is selected from V, Cr, Mn, Fe, Co, Ni, Cu, Ag, Au, Zn, Ru, Rh, Pd and Pt, especially Cr, Mn, Fe, Co, Ni, Cu, Zn, Ru and Rh; and M' is selected from Fe and Ru.

In some embodiments, the co-ordination framework comprising complexes of Formula (III) is a co-ordination framework comprising complexes of Formula (IV)

$$A_x(M_2[M'(CN)_6]) \qquad \text{Formula (IV)}$$

wherein A is selected from Li$^+$, Na$^+$, K$^+$, Be$^{2+}$, Mg$^{2+}$ and Ca$^{2+}$, especially Li$^+$, Na$^+$ and K$^+$, M and M' are as defined above in the second aspect, 0<x≤8, and A is located in the pores of the framework.

In some embodiments, M is in the +2 oxidation state. In some embodiments, M is in the +3 oxidation state. In some embodiments, M' is in the +2 oxidation state. In some embodiments, M' is in the +3 oxidation state.

In some particular embodiments, M is Cu.

In some embodiments, one or more M or [M'(CN)$_6$] groups and/or M$_2$[M'(CN)$_6$] complexes are absent from the framework.

In some embodiments, the co-ordination framework further comprises a pore surface modifying agent.

In a third aspect, the present invention provides a co-ordination framework obtained by a method comprising contacting a co-ordination framework of the first or second aspect, with a pore surface modifying agent.

In some embodiments, the pore surface modifying agent is selected from NH$_3$, ethylene diamine (H$_2$NCH$_2$CH$_2$NH$_2$), pyridine, mono, poly or perfluoroC$_{1-10}$alkylamine (e.g. CF$_3$(CF$_2$)$_2$NH$_2$), tetrahydrofuran (THF) or thiophene.

In a fourth aspect, the present invention provides a method of preparing a co-ordination framework comprising complexes of Formula (IV)

$$A_x(M_2[M'(CN)_6]) \qquad \text{Formula (IV)}$$

wherein A is selected from Li$^+$, Na$^+$, K$^+$, Be$^{2+}$, Mg$^{2+}$ and Ca$^{2+}$, especially Li$^+$, Na$^+$ and K$^+$, M is selected from V, Cr, Mn, Fe, Co, Ni, Cu, Ag, Au, Zn, Ru, Rh, Pd and Pt, especially Cr, Mn, Fe, Co, Ni, Cu, Zn, Ru and Rh, M' is selected from Fe and Ru, 0<x≤8, A is located in the pores of the framework; and wherein the method comprises contacting a first aqueous solution comprising an M$^{2+}$ ion with a second aqueous solution comprising a lithium, sodium or potassium salt of [Fe$^{II}$(CN)$_6$]$^{4-}$ or [Ru$^{II}$(CN)$_6$]$^{4-}$ under conditions which maintain a diffusion zone between the first aqueous solution and the second aqueous solution for a time of in excess of 1 day, thereby forming a precipitate or suspension of the co-ordination framework comprising complexes of Formula (IV) in the diffusion zone.

In some embodiments, the method further comprises isolating the precipitate or suspension of the co-ordination framework comprising complexes of Formula (IV) formed in the diffusion zone.

In some embodiments, the M$^{2+}$ ion is derived from a salt selected from M(CH$_3$CH$_2$COO)$_2$, M(SO$_4$), a hydrate thereof and a mixture thereof.

In some embodiments, more than 95% of M is in the +2 oxidation state.

In some embodiments, more than 95% of M' is in the +2 oxidation state.

In a fifth aspect, the present invention provides a method of preparing a modified co-ordination framework, the method comprising contacting a co-ordination framework according to first or second aspect with a pore surface modifying agent.

In a sixth aspect, the present invention provides a co-ordination framework obtained by the method according to the fourth or fifth aspect.

BRIEF DESCRIPTION OF THE FIGURES

Preferred embodiments of the present invention are described below, by way of example only, with reference to the accompanying drawings in which:

FIG. 10 shows high temperature Rietveld refinement of $Fe^{II}_2[Ru^{II}(CN)_6]$; FIG. 11 shows a zoom of high angle region for high temperature Rietveld refinement of $Fe^{II}_2[Ru^{II}(CN)_6]$; FIG. 12 shows high temperature Rietveld refinement of $Co^{II}_2[Ru^{II}(CN)_6]$; and FIG. 13 shows a zoom of high angle region for high temperature Rietveld refinement of $Co^{II}_2[Ru^{II}(CN)_6]$.

DETAILED DESCRIPTION OF EMBODIMENTS OF THE INVENTION

In a first aspect, the present invention provides a co-ordination framework comprising complexes of Formula (I)

$$M_2[M'(CN)_6] \qquad \text{Formula (I)}$$

wherein

M is selected from V, Cr, Mn, Fe, Co, Ni, Cu, Ag, Au, Zn, Ru, Rh, Pd and Pt, especially Cr, Mn, Fe, Co, Ni, Cu, Zn, Ru and Rh; and M' is selected from Fe and Ru;

provided that when M' is Fe, M is not Mn, Co, Ni, Cu or Fe.

Figure 1:
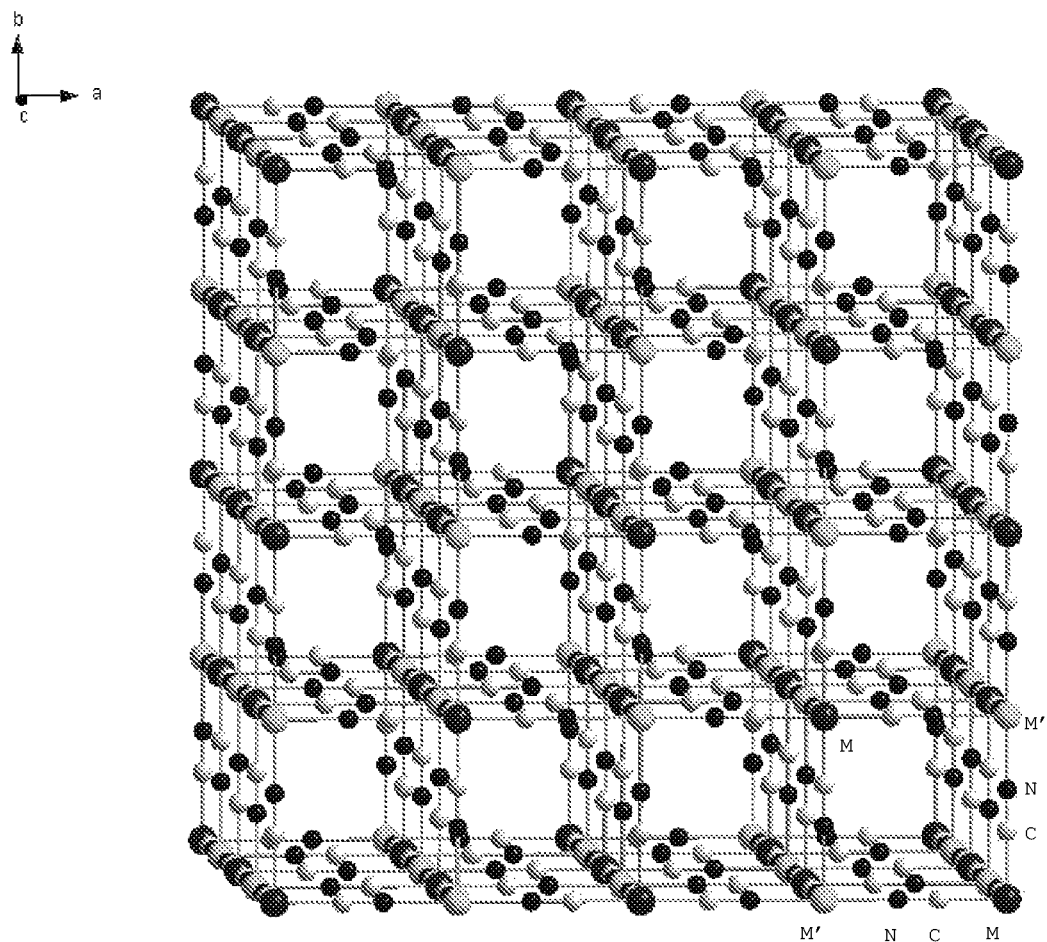
FIG. 1 shows a representation of a generic structure of a cubic vacancy framework material (vacancies, counterions and water guests are omitted for clarity). M=V, Cr, Mn, Fe, Co, Ni, Cu, Ag, Au, Zn, Ru, Rh, Pd or Pt; M'=Ru or Fe.
Figure 2:
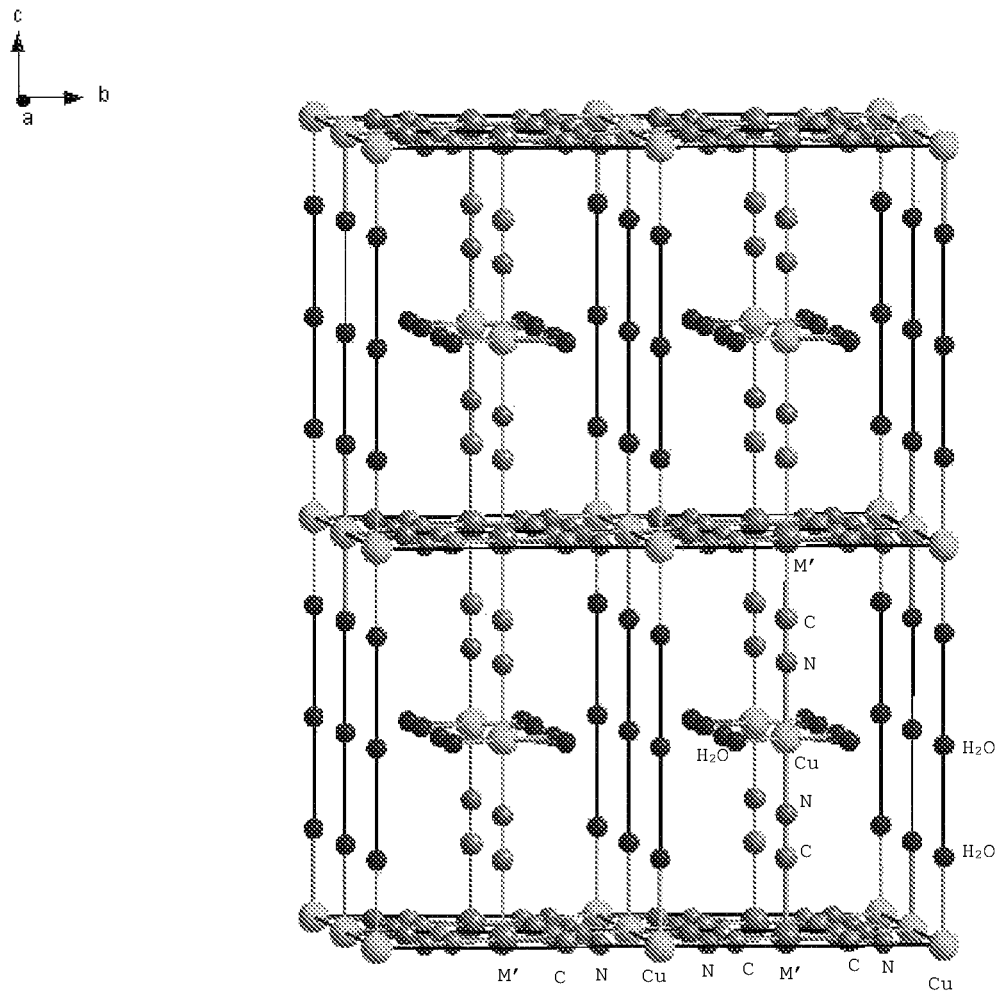
FIG. 2 shows a representation of the Pillar Hoffman structure of the materials Cu$^{II}$$_2$[Fe$^{II}$(CN)$_6$] and Cu$^{II}$$_2$[Ru$^{II}$(CN)$_6$] as described in the Examples (M'=Ru or Fe in Figure)

The co-ordination frameworks comprising complexes of Formula (I) are cyano-bridged frameworks comprising multiple complexes of Formula (I). When M is other than Cu, Ag or Au (i.e. V, Cr, Mn, Fe, Co, Ni, Zn, Ru, Rh, Pd or Pt), the co-ordination framework may exhibit a cubic vacancy structure (as depicted in FIG. 1). When M is Cu, Ag or Au, the framework may exhibit a Pillar Hoffman structure (as depicted in FIG. 2). As a person skilled in the art will appreciate, the framework may include vacancies and/or charged interstitial species to balance the charge in the framework. For example, when M' is $M^{III}$, M is $M^{II}$, the framework may host, for example, $Li^+$, $Na^+$, or $K^+$ species in the pores of the framework. The charge may also be balanced by oxidising or reducing M and/or M' (e.g. M being $M^{II}$ or $M^{III}$, and/or M' being $M^{II}$ or $M^{III}$); and/or by M, $[M'(CN)_6]$ or $M_2[M'(CN)_6]$ being randomly absent. As a person skilled in the art will appreciate, when M or $[M'(CN)_6]$ are absent, the empirical formula of the overall co-ordination framework may change. The empirical formula of the overall co-ordination framework with M or $[M'(CN)_6]$ absent may vary, for example, from about $M_{10}[M'(CN)_6]$ to about $M_{0.1}[M'(CN)_6]$, for example, from about $M_5[M'(CN)_6]$ to about $M_{0.2}[M'(CN)_6]$, from about $M_4[M'(CN)_6]$ to about $M_{0.5}[M'(CN)_6]$, from about $M_3[M'(CN)_6]$ to about $M_1[M'(CN)_6]$ or about $M_2[M'(CN)_6]$.

In some embodiments of frameworks comprising complexes of Formula (I), M is $M^{II}$ or $M^{III}$, especially $M^{II}$. In some embodiments, M' is $M^{II}$ or $M^{III}$, especially $M^{II}$.

In some embodiments, the co-ordination framework comprising complexes of Formula (I) is comprised of at least 90% complexes of Formula (I) (e.g. at least 95%, at least 97%, at least 98%, at least 99%, at least 99.5%, at least 99.8%, at least 99.9%, at least 99.95% or at least 99.99%).

In some embodiments, the co-ordination framework comprises complexes of Formula (II):

$$A_x(M_2[M'(CN)_6]) \qquad \text{Formula (II)}$$

wherein A is selected from $Li^+$, $Na^+$, $K^+$, $Be^{2+}$, $Mg^{2+}$ and $Ca^{2+}$, especially $Li^+$, $Na^+$ and $K^+$, M and M' are as defined for Formula (I), 0<x≤8, and A is located in the pores of the framework.

In the co-ordination frameworks comprising complexes of Formula (II), "A" may be described as a "charge carrying ion" or "interstitial pore ion" and may be said to reside in the "pore space" within the co-ordination framework. Such charge carrying ions are not covalently bonded within the framework and may migrate through the co-ordination framework through pore spaces and channels created through long range ordering present in crystalline materials. As a person skilled in the art will appreciate, "x" may be said to represent the relative amount of A in the co-ordination framework. "x" includes integer and non-integer values greater than 0 and less than or equal to 8.

In some embodiments of frameworks comprising complexes of Formula (II), M is MN or $M^{III}$, especially $M^{II}$. In some embodiments, M' is $M^{II}$ or $M^{III}$, especially $M^{II}$.

In some embodiments, the co-ordination framework comprising complexes of Formula (II) is comprised of at least 90% complexes of Formula (II) (e.g. at least 95%, at least 97%, at least 98%, at least 99%, at least 99.5%, at least 99.8%, at least 99.9%, at least 99.95% or at least 99.99%).

In a second aspect, the present invention provides a highly crystalline co-ordination framework comprising complexes of Formula (III)

$$M_2[M'(CN)_6] \qquad \text{Formula (III)}$$

wherein

M is selected from V, Cr, Mn, Fe, Co, Ni, Cu, Ag, Au, Zn, Ru, Rh, Pd and Pt, especially Cr, Mn, Fe, Co, Ni, Cu, Zn, Ru and Rh; and M' is selected from Fe and Ru.

In some embodiments of frameworks comprising complexes of Formula (III), M is $M^{II}$ or $M^{III}$, especially $M^{II}$. In some embodiments, M' is $M^{II}$ or $M^{III}$, especially $M^{II}$.

In some embodiments, the co-ordination framework comprising complexes of Formula (III) is comprised of at least 90% complexes of Formula (III) (e.g. at least 95%, at least 97%, at least 98%, at least 99%, at least 99.5%, at least 99.8%, at least 99.9%, at least 99.95% or at least 99.99%).

In some embodiments, the highly crystalline co-ordination framework comprises complexes of Formula (IV):

$$A_x(M_2[M'(CN)_6])  \quad \text{Formula (IV)}$$

wherein
A is selected from $Li^+$, $Na^+$, $K^+$, $Be^{2+}$, $Mg^{2+}$ and $Ca^{2+}$, especially $Li^+$, $Na^+$ and $K^+$, M and M' are as defined for formula (III), $0<x\leq 8$, and wherein A is located in the pores of the framework.

In some embodiments of frameworks comprising complexes of Formula (IV), M is $M^{II}$ or $M^{III}$, especially $M^{II}$. In some embodiments, M' is $M^{II}$ or $M^{III}$, especially $M^{III}$.

In some embodiments, the co-ordination framework comprising complexes of Formula (IV) is comprised of at least 90% complexes of Formula (IV) (e.g. at least 95%, at least 97%, at least 98%, at least 99%, at least 99.5%, at least 99.8%, at least 99.9%, at least 99.95% or at least 99.99%).

The crystallinity of co-ordination frameworks comprising complexes of Formula (I), (II), (III) or (IV) may be assessed by a number of techniques. As used herein, "highly crystalline" (and variations thereof such as "high crystallinity"), in relation to Frameworks comprising complexes of Formula (I), (II), (III) or (IV), is used to describe materials that satisfy one or more or all of the following conditions:

(i) An X-ray diffractogram containing one or more peaks having a narrow peak shape, wherein the X-ray diffractogram is obtained using a Cu source with $\lambda=1.504$ Å. As referred to herein, a "narrow peak shape" refers to a peak which has a base width of less than 1 2θ or 1 Q, and a relative height to width ratio of at least 1000:1.

(ii) An X-ray diffractogram containing one or more peaks having a Gaussian or Lorentzian peak shape, wherein the X-ray diffractogram is obtained using a Cu source with $\lambda=1.504$ Å. As referred to herein, a "Gaussian" or "Lorentzian" peak shape refers to a symmetrical peak, which can be modelled using only pure Gaussian or Lorentzian parameters, using the General Structure Analysis System (GSAS). GSAS is a well-known structure analysis system which uses many parameters to model 2D diffraction patterns into 3D structures. Highly crystalline materials typically only need the 3 Gaussian and the 2-3 Lorentzian parameters to model peak shape once the unit cell dimension size and unit cell type have been defined correctly (Reference for GSAS 1: A. C. Larson and R. B. Von Dreele, "General Structure Analysis System (GSAS)", Los Alamos National Laboratory Report LAUR 86-748 (1994). Reference for GSAS 2: B. H. Toby, EXPGUI, a graphical user interface for GSAS, J. Appl. Cryst. (2001) 34, 210-213);

(iii) one or more high intensity peaks where the high intensity peak is at least 40 times baseline in an X-ray diffractogram obtained using a Cu source with $\lambda=1.504$ Å (e.g. measured using single crystal X-ray sources, or Synchrotron X-ray sources);

(iv) one or more high intensity peaks where the high intensity peak has at least 5,000 counts (e.g. more than 10,000 counts, more than 20,000 counts, more than 30,000 counts, more than 40,000 counts or more than 50,000 counts) in an X-ray diffractogram obtained on an X'Pert Panalytical instrument using a Cu source with $\lambda=1.504$ Å;

(v) one or more peaks above $2\theta=40°$ (e.g. one or more peaks above $2\theta=50°$, 60°, 70° or 80°) in an X-ray diffractogram obtained using a Cu source with $\lambda=1.504$ Å (sometimes referred to as having peaks at high angle or high Q).

In addition, "highly crystalline", in relation to frameworks comprising complexes of Formula (I), (II), (III) or (IV), may also be used to describe materials that satisfy one or more or all of the following conditions:

(i) in the form of a solid particulate material comprising crystals having at least one dimension of greater than 400 Å;

(ii) in the form of solid particulate material comprising more than 90 wt % crystalline material and less than 10 wt % amorphous material.

Narrower peaks in the X-ray diffractogram may be indicative of larger crystalline particle size (e.g. microcrystallites) and peaks at high angle or high Q (e.g. one or more peaks above $2\theta=40°$ or 50) ° may be indicative of long range ordering within crystalline particles.

A non-flat baseline in the X-ray diffractogram may be indicative of co-ordination frameworks containing some amorphous material. As referred to herein, a "non-flat baseline" refers to a baseline which varies in intensity by more than 50% from its mean value across the diffraction angle 5 2θ to 80 2θ (2θ given $\lambda=1.504$ Å). Broader peaks in the X-ray diffractogram may be indicative of smaller crystalline particle size. Poorly crystalline materials also do not diffract at high angle (high Q) in the X-ray diffractogram.

As a person skilled in the art will appreciate, the "crystallinity" of a material may therefore lie on a continuum from poorly crystalline material (bordering amorphous material), through crystalline material to highly crystalline material.

In some embodiments the crystalline or highly crystalline co-ordination frameworks comprising complexes Formula (I), (II), (III) or (IV) are solvated, wherein solvent molecules are present within the framework, optionally co-ordinated to one or more metal ions. In some embodiments, the frameworks are desolvated or partially desolvated. When the frameworks are desolvated or partially desolvated, at least some solvent molecules within the framework are removed from the framework.

In some embodiments, the crystalline or highly crystalline co-ordination frameworks comprising complexes of formula (I), (II), (III) or (IV) have vacancies within the crystalline structure. For example, throughout the ordered crystalline structure of the framework one or more M or $[M'(CN)_6]$ groups and/or $M_2[M'(CN)_6]$ complexes may be absent from the co-ordination framework. The absence may be random (i.e randomly absent). The absence of a M or $[M'(CN)_6]$ group or a $M_2[M'(CN)_6]$ complex provides a vacancy in the framework that may balance a charge or provide a larger pore. The absence or vacancy of the M or $[M'(CN)_6]$ group or the $M_2[M'(CN)_6]$ complex does not typically reduce the crystallinity of the framework. In some embodiments, the absence of one or more M or $[M'(CN)_6]$ groups and/or $M_2[M'(CN)_6]$ complexes may contribute to forming a co-ordination framework that has an overall neutral charge. In some embodiments, the absence of one or more M or $[M'(CN)_6]$ groups and/or $M_2[M'(CN)_6]$ complexes in conjunction with one or more other charge carrying ions may contribute to forming a co-ordination framework that has an overall neutral charge. As a person skilled in the art will appreciate, such "neutral" co-ordination frameworks may be further subjected to conditions that perturb the charge from neutral (e.g. applied voltage/voltage induced (electric) redox reactions, chemical oxidation and/or reduction, and electric field induced (non-physical contact) redox reactions).

The crystalline or highly crystalline co-ordination frameworks comprising complexes of formula (I), (II), (III) or (IV) may comprise up to 50 mol % vacancies. That is, the total amount of M, $[M'(CN)_6]$ and $M_2[M'(CN)_6]$ groups/complexes that are absent from the co-ordination framework is less than 50 mol % (e.g. up to every second charge centre is missing).

In some circumstances it may be convenient to refer to stoichiometric ratios rather than mol % as there are multiple entities that may be vacant. For example, when describing a system with three components, it may be difficult to have a fixed amount of one component while the ratio between the other two components varies. Accordingly, in some circumstances it may be convenient to refer to a co-ordination framework comprising complexes of Formula (I) using the nomenclature of Formula (Ia):

$$M_{2-y}[M'(CN)_6]_{1-z} \quad \text{Formula (Ia)}$$

wherein M and M' are as defined in Formula (I), 0<y≤2, and 0<z≤1 (provided it otherwise satisfies Formula (I)). Such nomenclature allows one to describe vacancies in the co-ordination framework through perturbations away from the non-vacancy empirical formula of the co-ordination framework. As will be appreciated, greater values for x and y define co-ordination frameworks having more vacancies, and hence have a greater perturbation from the non-vacancy empirical formula of the co-ordination framework.

Similarly, in some circumstances it may be convenient to refer to a co-ordination framework comprising complexes of Formula (II) using the nomenclature of Formula (IIa):

$$A_x(M_{2-y}[M'(CN)_6]_{1-z}) \quad \text{Formula (IIa)}$$

wherein A, x, M and M' are as defined in Formula (II), 0<y≤2, and 0<z≤1 (provided it otherwise satisfies Formula (II)).

Similarly, in some circumstances it may be convenient to refer to a co-ordination framework comprising complexes of Formula (III) using the nomenclature of Formula (IIIa):

$$M_{2-y}[M'(CN)_6]_{1-z} \quad \text{Formula (Ia)}$$

wherein M and M' are as defined in Formula (III), 0<y≤2, and 0<z≤1 (provided it otherwise satisfies Formula (III)).

Similarly, in some circumstances it may be convenient to refer to a co-ordination framework comprising complexes of Formula (IV) using the nomenclature of Formula (IVa):

$$A_x(M_{2-y}[M'(CN)_6]_{1-x}) \quad \text{Formula (IVa)}$$

wherein A, x, M and M' are as defined in Formula (IV), 0<y≤2, and 0<z≤1 (provided it otherwise satisfies Formula (IV)).

Formulas (Ia), (IIa), (IIIa) and (IVa) include the variables "y" and "z". The variables "y" and "z" may be integer or non-integer values.

Formulas (II), (IIa), (IV) and (IVa) include "$A_z$", where "A" may be described as a "charge carrying ion" and "x" may be said to represent the relative amount of A in the co-ordination framework.

The lower limit for x is greater than zero (e.g. 0<x<8, 0<x≤7, 0<x≤6, 0<x≤5, 0<x≤4, 0<x≤3, 0<x≤2, 0<x≤1). In some embodiments, the lower limit for x is 1 (e.g. 1≤x≤8, 1≤x≤7, 1≤x≤6, 1≤x≤5, 1≤x≤4, 1≤x≤3, 1≤x≤2). In some embodiments, the lower limit for x is 2 (e.g. 2≤x≤8, 2≤x≤7, 2≤x≤6, 2≤x≤5, 2≤x≤4, 2≤x≤3). In some embodiments, the lower limit for x is 3 (e.g. 3≤x≤8, 3≤x≤7, 3≤x≤6, 3≤x≤5, 3≤x≤4). In some embodiments, the lower limit for x is 4 (e.g. 4≤x≤8, 4≤x≤7, 4≤x≤6, 4≤x≤5). In some embodiments, the lower limit for x is 5 (e.g. 5≤x≤8, 5≤x≤7, 5≤x≤6). In some embodiments, the lower limit for x is 6 (e.g. 6≤x≤8, 6≤x≤7). In some embodiments, the lower limit for x is 7 (e.g. 7≤x≤8). In some particular embodiments, the upper limit for x is 4 (i.e. 4). In some particular embodiments, x is approximately 2 (e.g. 1≤x≤3); such values have thus far proven operationally simpler to achieve electrochemically than other values.

In some embodiments the co-ordination frameworks comprising complexes of Formula (I), (II), (III) or (IV) having higher crystallinity have increased porosity. In some embodiments, the co-ordination frameworks comprising complexes of Formula (I), (II), (III) or (IV) having increased porosity have a number of bare/open metal sites which can capture various ions, solvents or gases. In particular embodiments, the frameworks may be desolvated, or at least partially desolvated. The ability to capture ions, solvents or gases give the frameworks a variety of commercial applications. The ability of the co-ordination frameworks comprising complexes of Formula (I), (II), (III) or (IV) to capture the various ions, solvents or gases, generally tends to improve with increased crystallinity.

In some embodiments, the crystalline or highly crystalline co-ordination frameworks comprising complexes of Formula (I), (II), (III) or (IV) also have useful thermal properties. In some embodiments, the crystalline or highly crystalline co-ordination frameworks comprising complexes of Formula (I), (II), (III) or (IV), particularly those that have been partially or entirely desolvated, exhibit zero or negative thermal expansion over a wide temperature range. In some embodiments, the frameworks exhibiting zero or negative thermal expansion over a wide temperature range have M' as Ru. As crystallinity increases, the co-ordination frameworks tend to: (1) exhibit more linear thermal expansion behaviour; (2) exhibit the characteristic thermal expansion property (positive, zero or negative) over a larger temperature range (e.g. more thermally stable over a higher temperature range, for example, maintain property at 900K instead of degradation (hence, reduction in property) at 450K and/or being less prone to degradation during a temperature ramp cycle); (3) exhibit the characteristic thermal expansion property (positive, zero or negative) more reversibly (e.g. being apparently infinitely reversible rather than degrading to some extent during each cycle); (4) produce greater negative thermal expansion for those materials which show negative thermal expansion; and/or (5) produce a more zero thermal expansion (smaller absolute magnitude) for those materials where zero thermal expansion is the characteristic thermal expansion property/behaviour. In some embodiments, particularly where M is Cu, desolvating crystalline frameworks comprising complexes of Formula (I) or (III), provides a framework having positive or negative thermal expansion.

Advantageously, co-ordination frameworks comprising complexes of Formula (I), (II), (III) or (IV) can be oxidised or reduced such that they exhibit two or more (i.e. multiple) stabilised electrochemical/redox states. The co-ordination frameworks comprising complexes of Formula (I), (II), (III) or (IV) can therefore be redox active. For example, the frameworks may be oxidised or reduced to provide $M^{II}/M^{III}$, $M^{II}/M^{III}$, $M^{III}/M^{III}$ or $M^{III}/M^{III}$ complexes within the framework.

Also advantageously, crystalline or highly crystalline co-ordination frameworks comprising complexes of Formula (I), (II), (III) or (IV) can be prepared that:
(a) exhibit two or more (i.e. multiple) stabilised electrochemical/redox states;
(b) exhibit zero or negative thermal expansion; or
(c) exhibit both multiple stabilised electrochemical/redox states and exhibit zero or negative thermal expansion.

Examples of co-ordination frameworks with more than two stabilised electrochemical/redox states are rare in the published literature. Materials that exhibit zero or negative thermal expansion are extremely rare in the published literature. Co-ordination frameworks which exhibit multiple redox states and negative/zero thermal expansion properties are extremely rare in the published literature.

In some embodiments, the co-ordination frameworks comprising complexes of Formula (I), (II), (III) or (IV) are in the form of microcrystallites. As used herein, the term "microcrystallite" refers to a solid particle having one, two or three dimensions greater than 400 Å and comprising more than 95 wt % crystalline material. For the avoidance of doubt, the term "microcrystallites" is the plural of "microcrystallite". In some embodiments, the microcrystallites comprise more than 98 wt % crystalline material (e.g. more than 99 wt %, more than 99.5 wt % or more than 99.9 wt % crystalline material). In some embodiments, the microcrystallites have one, two or three dimensions greater than about 500 Å (e.g. greater than about 100 nm, greater than about 200 nm, greater than about 500 nm, greater than about 1 μm, greater than about 2 μm, greater than about 5 μm, greater than about 10 μm, greater than about 20 μm, greater than about 50 μm, greater than about 100 μm, greater than about 200 μm, greater than about 500 μm, greater than about 1 mm, greater than about 2 mm). In some embodiments, the microcrystallites have one, two or three dimensions of up to about 5 mm (e.g. up to about 2 mm, up to about 1.5 mm, up to about 1 mm, up to about 500 μm, up to about 200 μm, up to about 100 μm, up to about 50 μm, up to about 20 μm, up to about 10 μm or up to about 1 μm). For example, in some embodiments the microcrystallites have one, two or three dimensions, especially two, more especially three, in the range of from about 500 Å to about 5 mm, such as from about 50 μm to about 2 mm, from about 500 μm to about 2 mm or from about 1 mm to about 2 mm. In some embodiments, the microcrystallites are composed of single crystals of the co-ordination frameworks comprising complexes of Formula (I), (II), (III) or (IV).

The co-ordination frameworks comprising complexes of Formula (I), (II), (III) or (IV) can also be further modified by incorporating a ligand or guest (such as a pore surface modifying agent, discussed below) into the framework to change the ion or gas selectivity or thermal expansion properties of the co-ordination framework. The modification of a co-ordination framework comprising complexes of Formula (I), (II), (III) or (IV) by incorporating a pore surface modifying agents into the framework is referred to herein as "post-synthetic modification".

Figure 4:
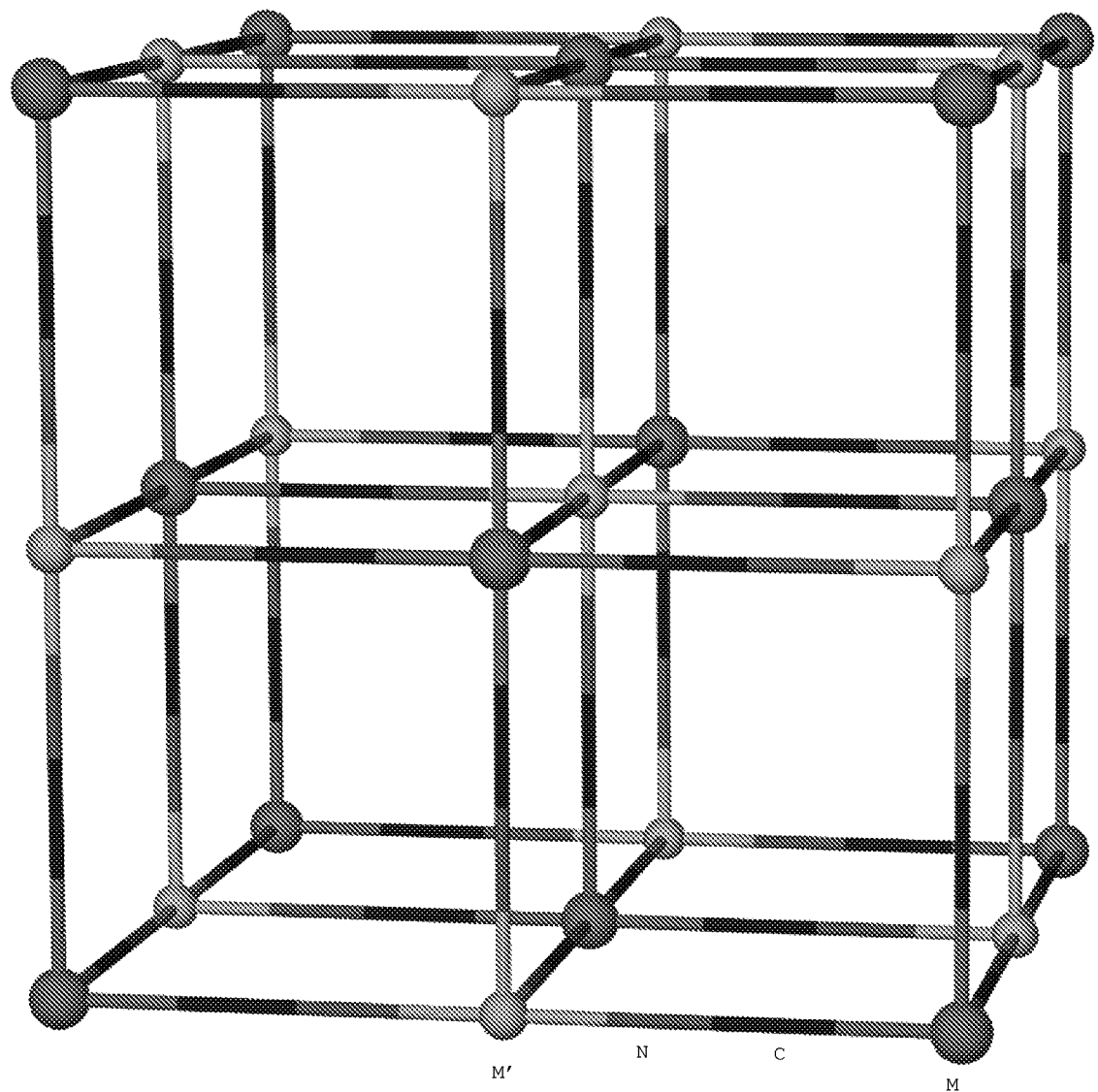
FIG. 4 shows a representation of the face centred cubic Fm3M unit cell of $Ni^{II}_2[Fe^{II}(CN)_6]$. The structure shown is an idealised non-vacancy structure (M=Ni, M'=Fe)
Figure 5:
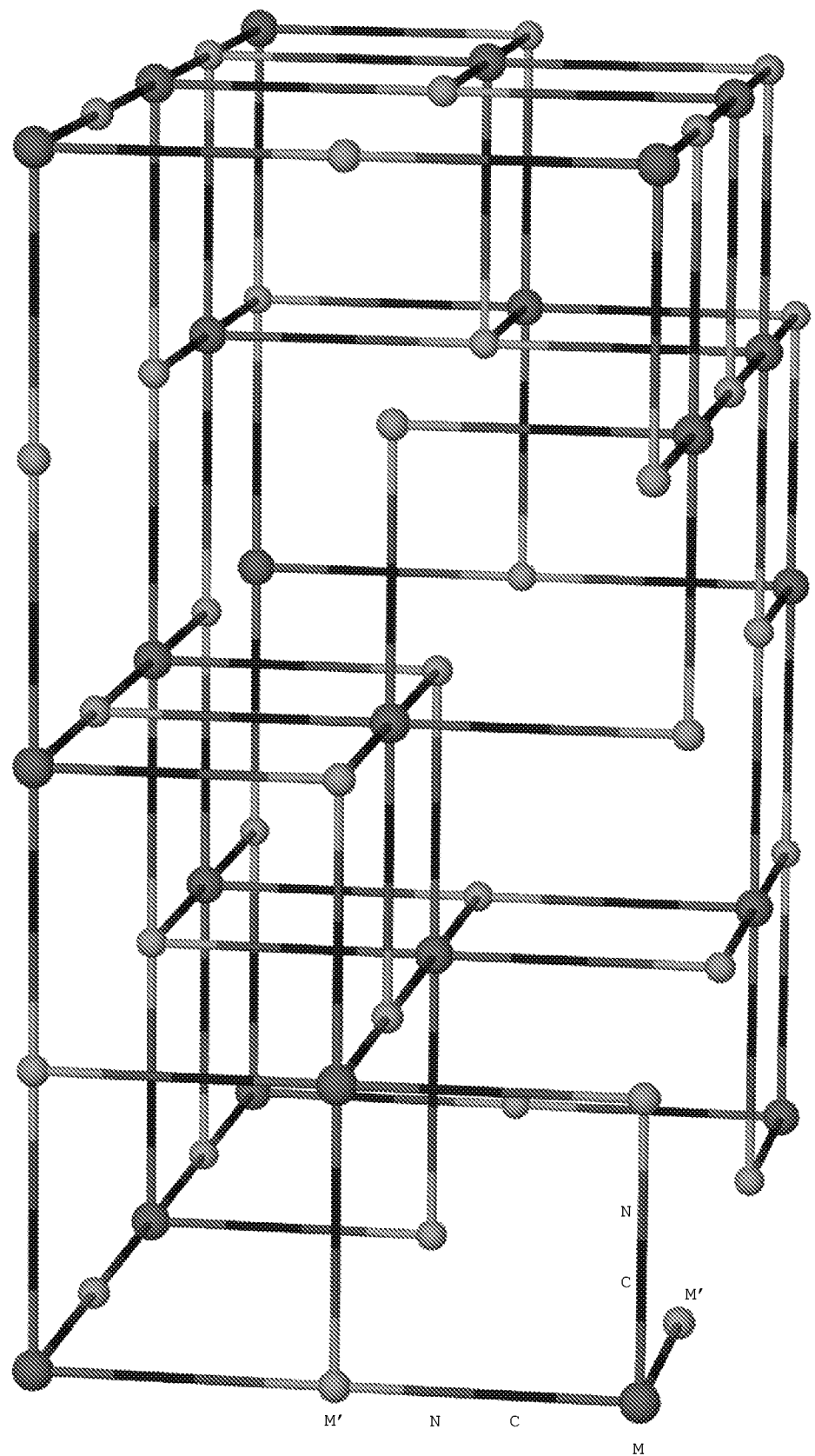
FIG. 5 shows a representation of a co-ordination framework having vacancies. The depicted co-ordination framework comprises $K_xNi^{II}_{2-y}[Fe^{II}(CN)_6]_{1-z}$, with Ni to Fe sites in the ratio 2:1, and a vacancy structure to achieve charge balance (M=Ni, M'=Fe; interstitial pore $K^+$ omitted for clarity)

In some embodiments, the co-ordination frameworks comprising complexes of Formula (I), (II), (III) or (IV), where M is selected from V, Cr, Mn, Fe, Co, Ni, Zn, Ru, Rh, Pd and Pt, have a face-centred cubic topology Fm$\bar{3}$m. Examples of non-vacancy and vacancy face-centred cubic Fm$\bar{3}$m unit cells of Ni$^{II}_2$[Fe$^{II}$(CN)$_6$] are depicted in FIGS. 4 and 5, respectively. The structures depicted in FIGS. 4 and 5 were refined from Rietveld analysis of data collected from the Australian Synchrotron in 2015.

Figure 6:
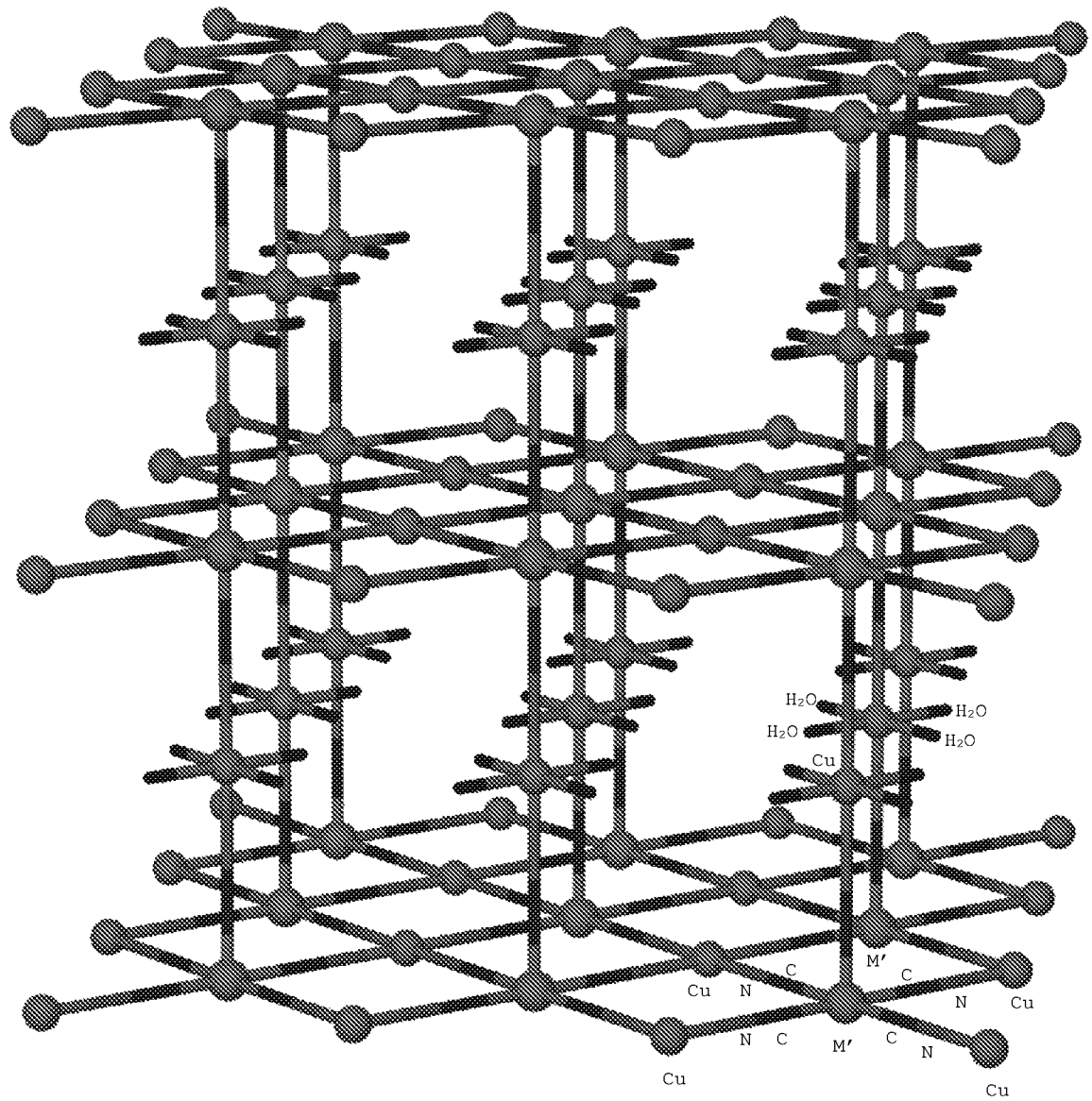
FIG. 6 shows a representation of Tetragonal pillared Hoffman-like structure with space group P4/mmm of $Cu^{II}_2[Fe^{II}(CN)_6]$ (M'=Fe)
Figure 7:
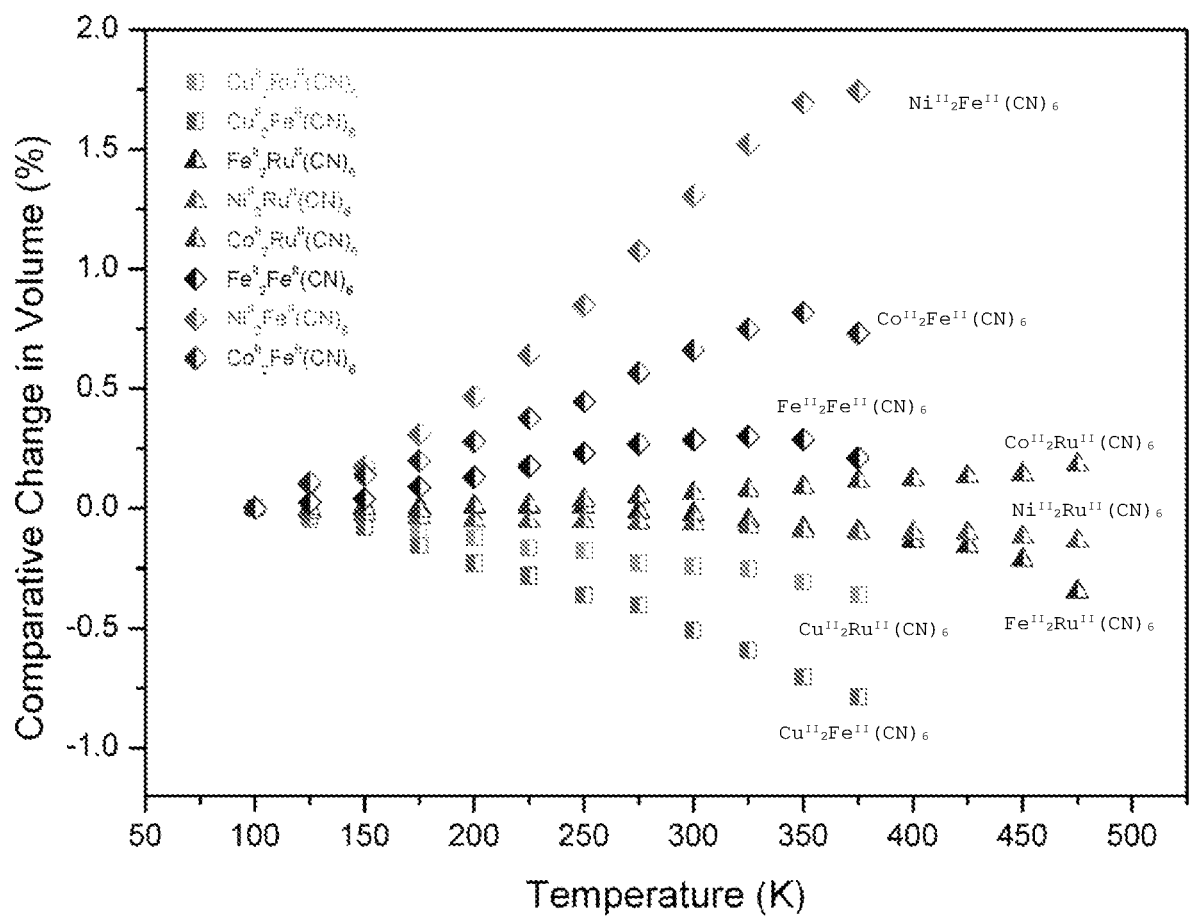
FIG. 7 is a graph showing the compositional dependence of thermal expansion observed as a relative change in unit cell volume for six cubic analogues $M^{II}_2[Fe^{II}(CN)_6]$ and $M^{II}_2[Ru^{II}(CN)_6]$ for M=Fe, Co, Ni; and two tetragonal analogues $Cu^{II}_2[Fe^{II}(CN)_6]$ and $Cu^{II}_2[Ru^{II}(CN)_6]$, from Rietveld refinement.
Figure 8:
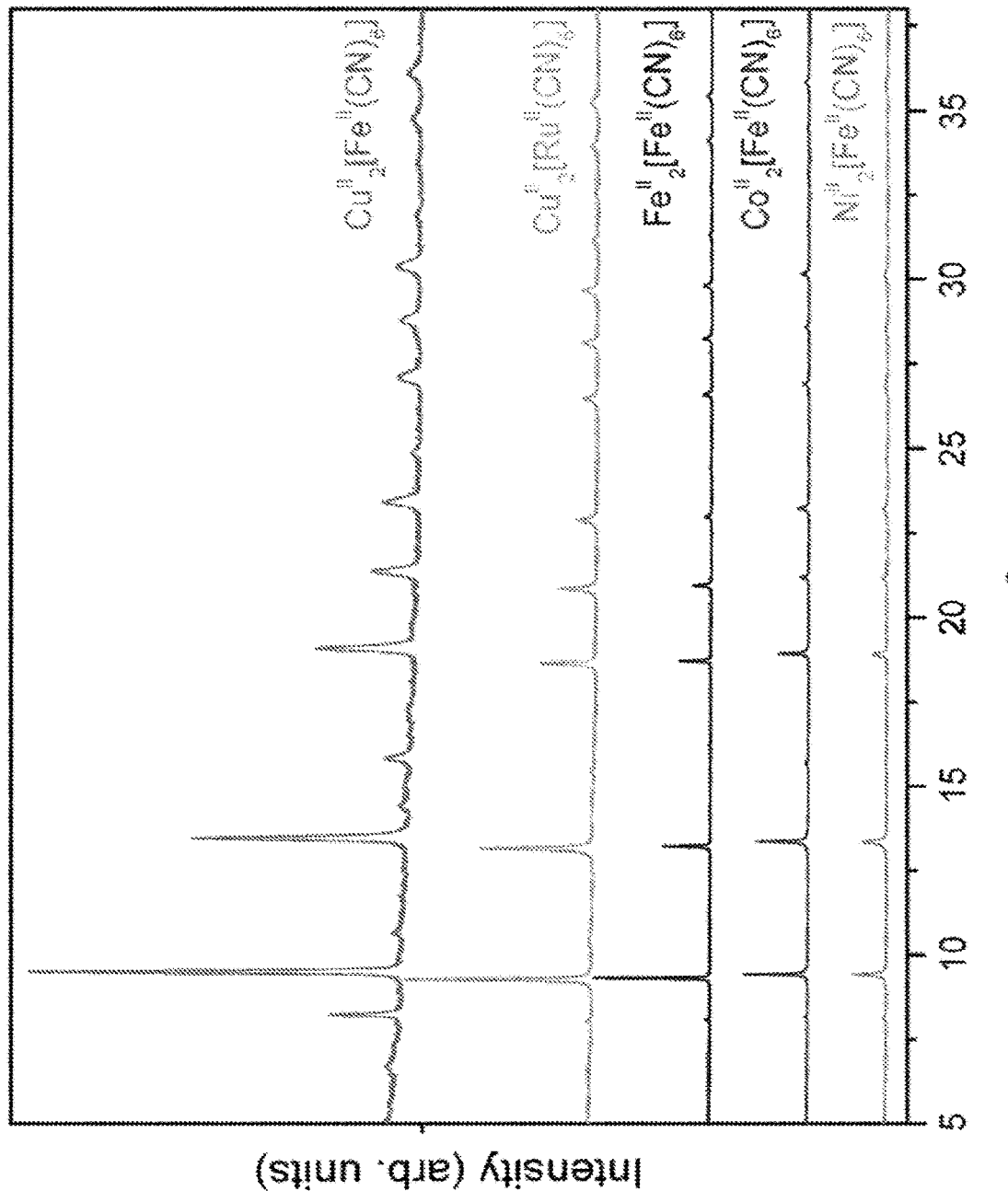
FIG. 8 is a stack plot of powder X-ray diffractograms of $M^{II}_2[Fe^{II}(CN)_6]$ (for $M^{II}$=Fe, Co, Ni, Cu), and $Cu^{II}_2[Ru^{II}(CN)_6]$ at 100 K (Glass Capillaries (0.5 mm) were desolvated at 310 K under high vacuum for 24 hr; Data from the Australian Synchrotron: λ=0.825954 Å)
Figure 9:
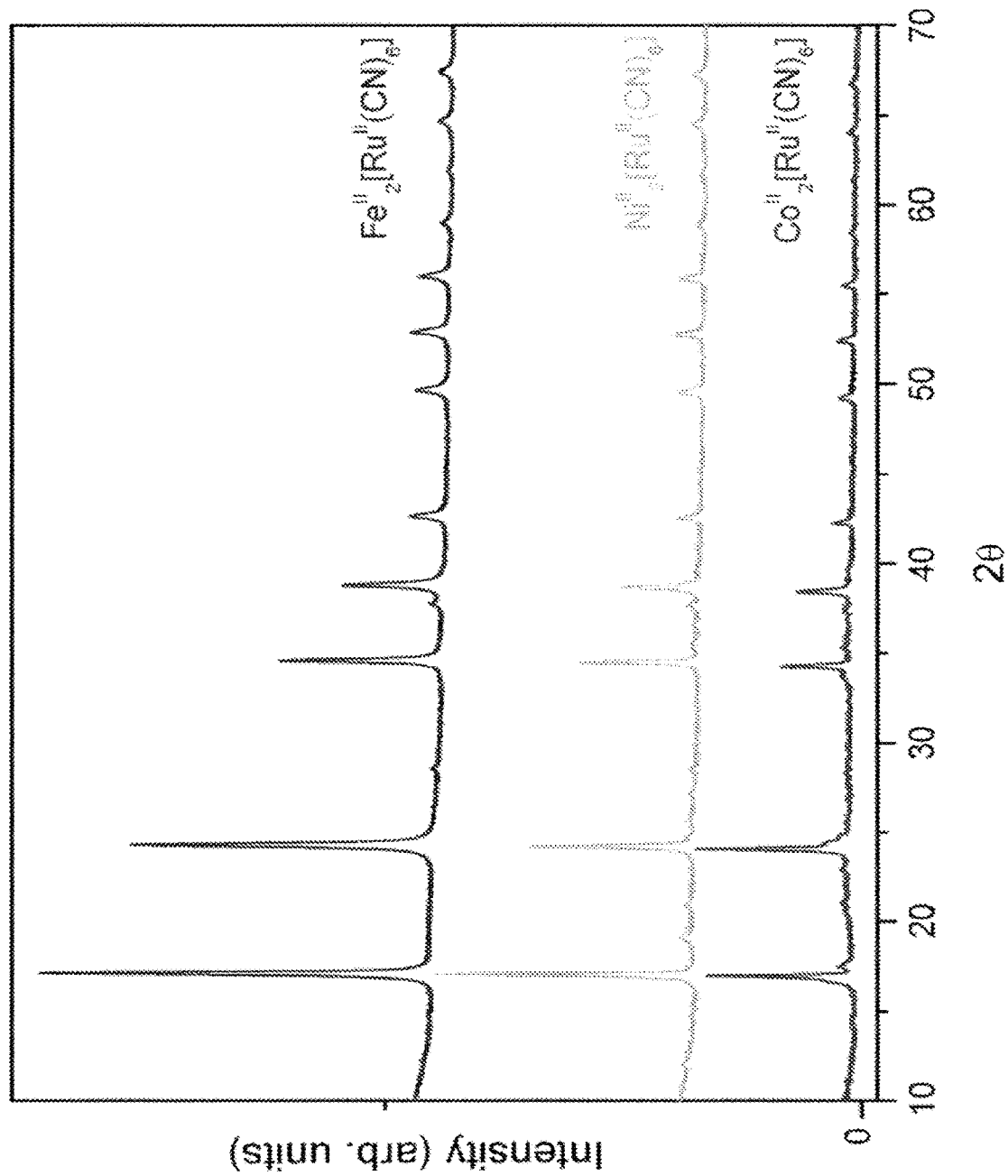
FIG. 9 is a stack plot of powder X-ray diffractograms of $M^{II}_2[Fe^{II}(CN)_6]$ (for $M^{II}$=Fe, Co, Ni) at 300 K. Samples were dried under $N_2$ (as synthesised) (Data from Laboratory Source: X'Pert Pro, X-ray reflectance diffractometry—Cu $K\alpha_1$ λ=1.54056 Å)
Figure 10:
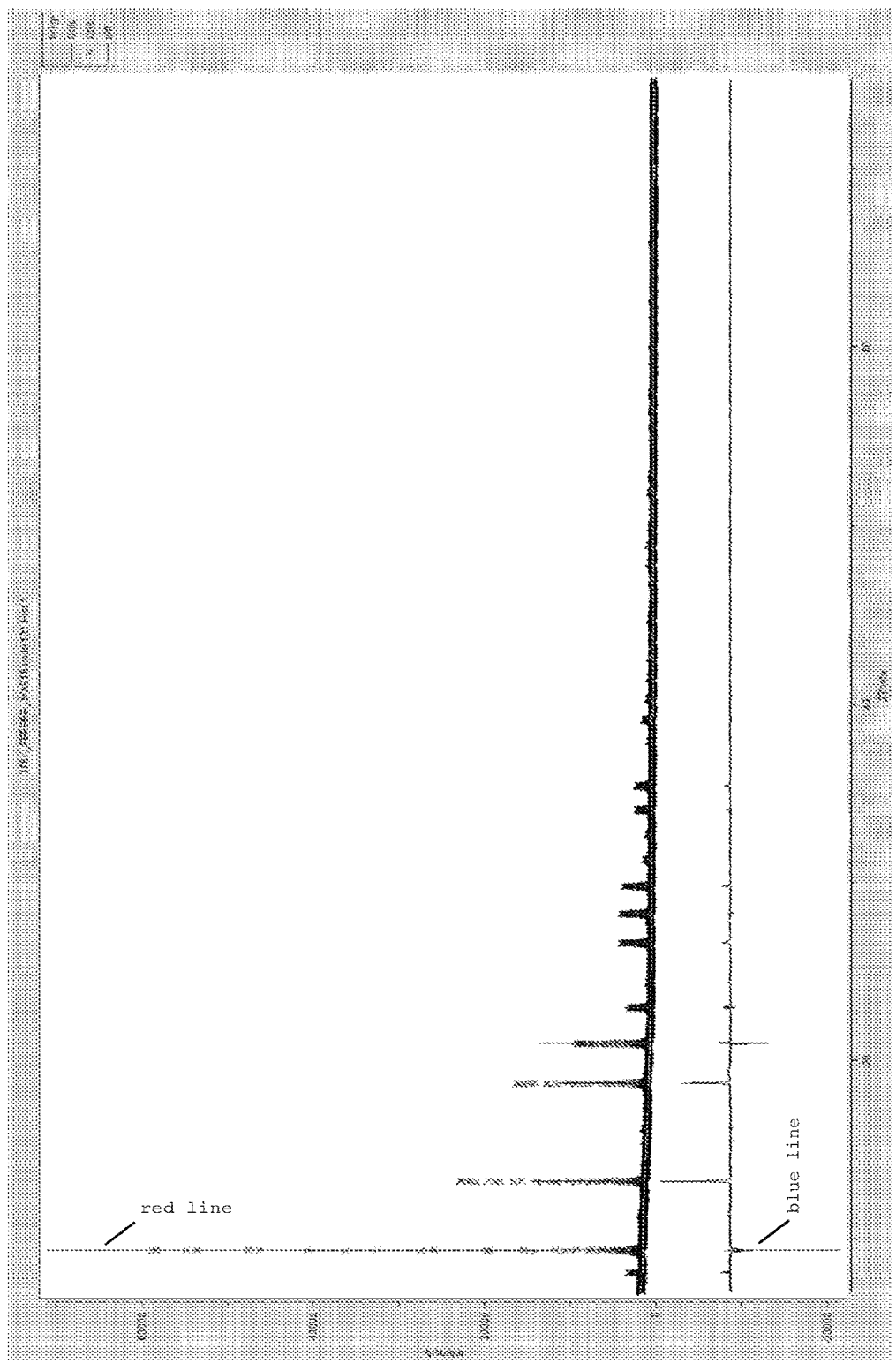
FIGS. 10, 11, 12 and 13 show X-ray diffractograms of $Fe^{II}_2[Ru^{II}(CN)_6]$ and $Co^{II}_2[Ru^{II}(CN)_6]$, wherein raw data (crosses) is compared with Rietveld model refinement (red line), with a line representing the difference shown in blue lines in FIGS. 10 and 12 (Data collected at the Australian Synchrotron to verify result of highly crystalline materials).
Figure 11:
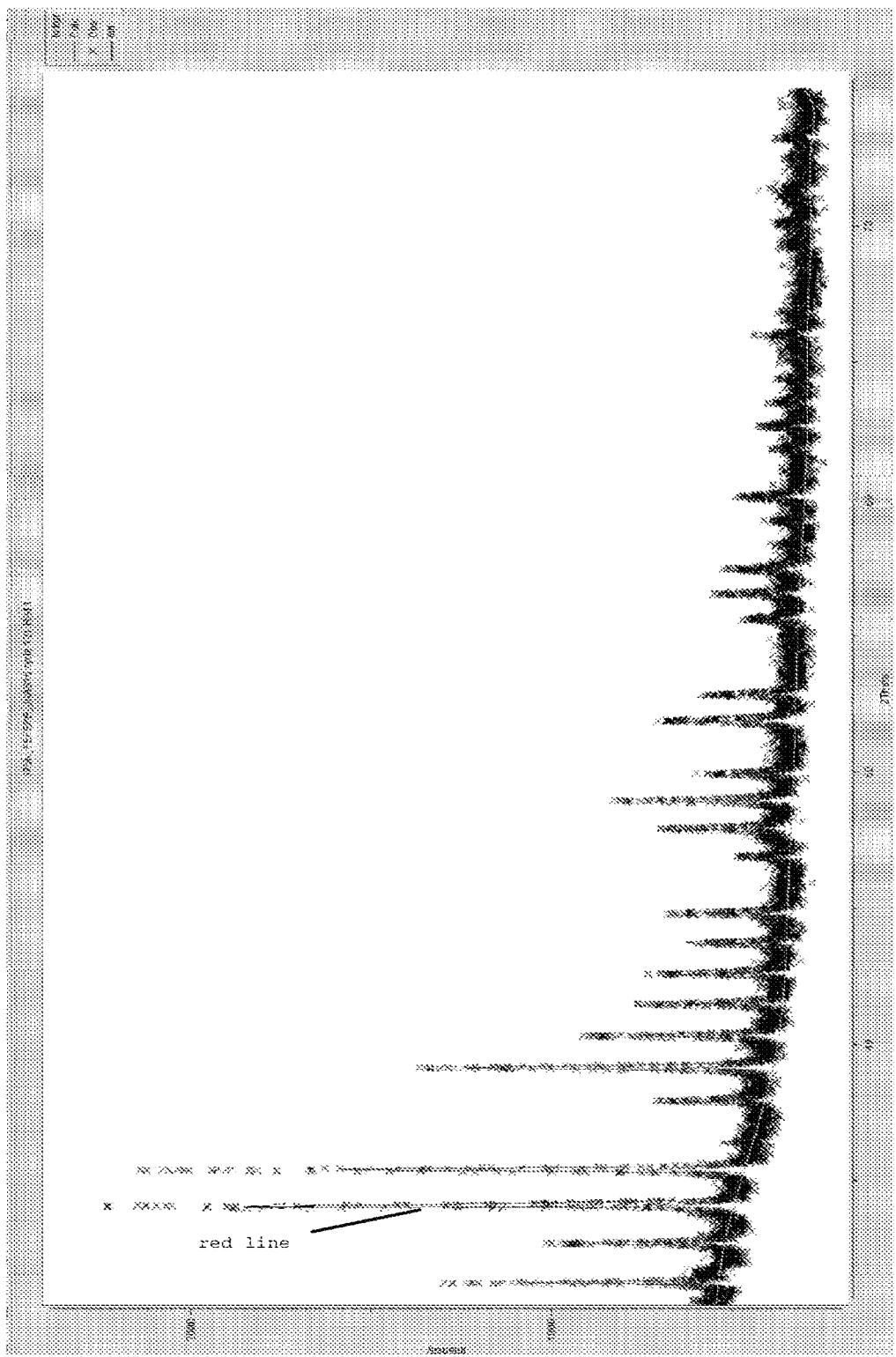
Figure 12:
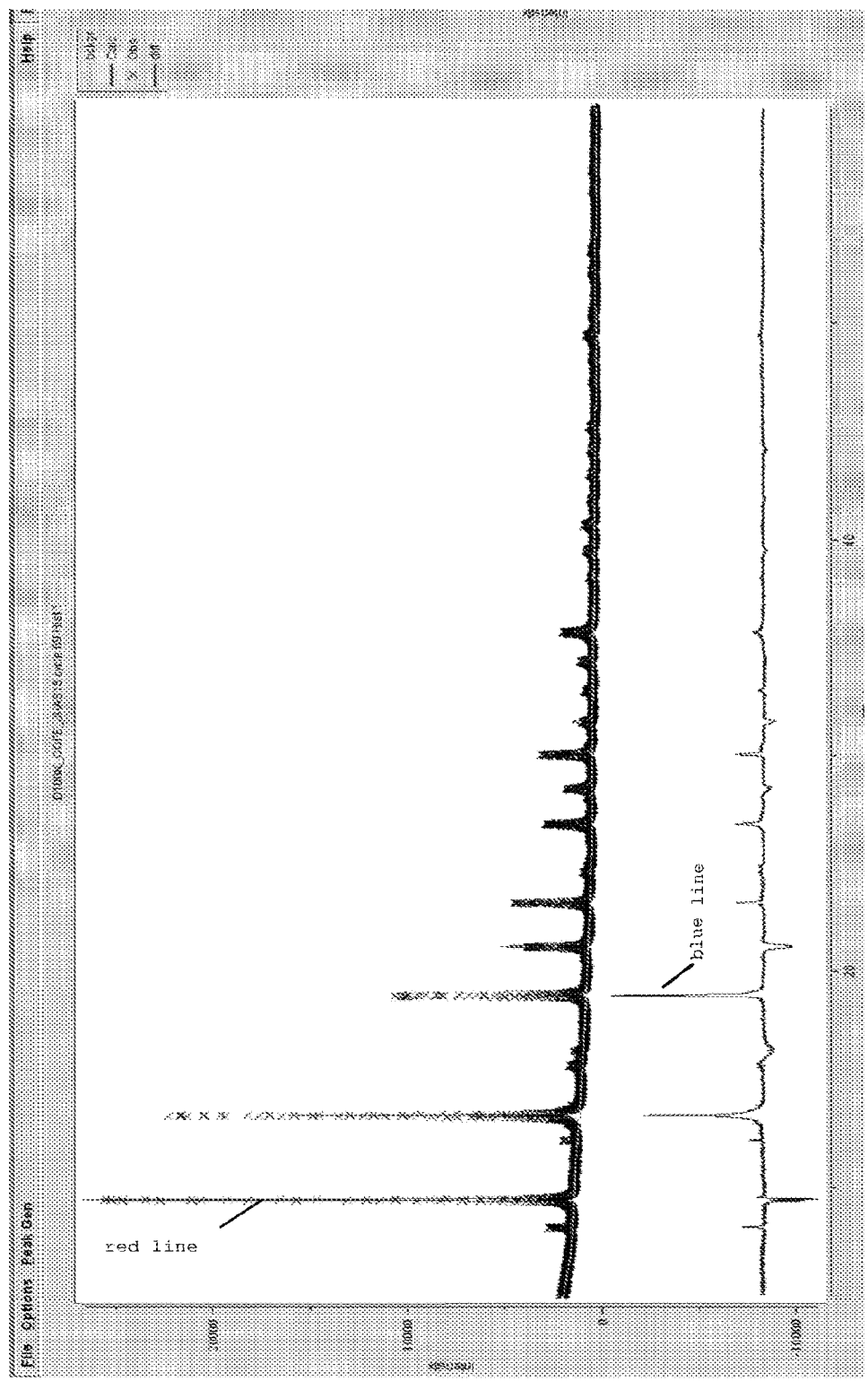
Figure 13:
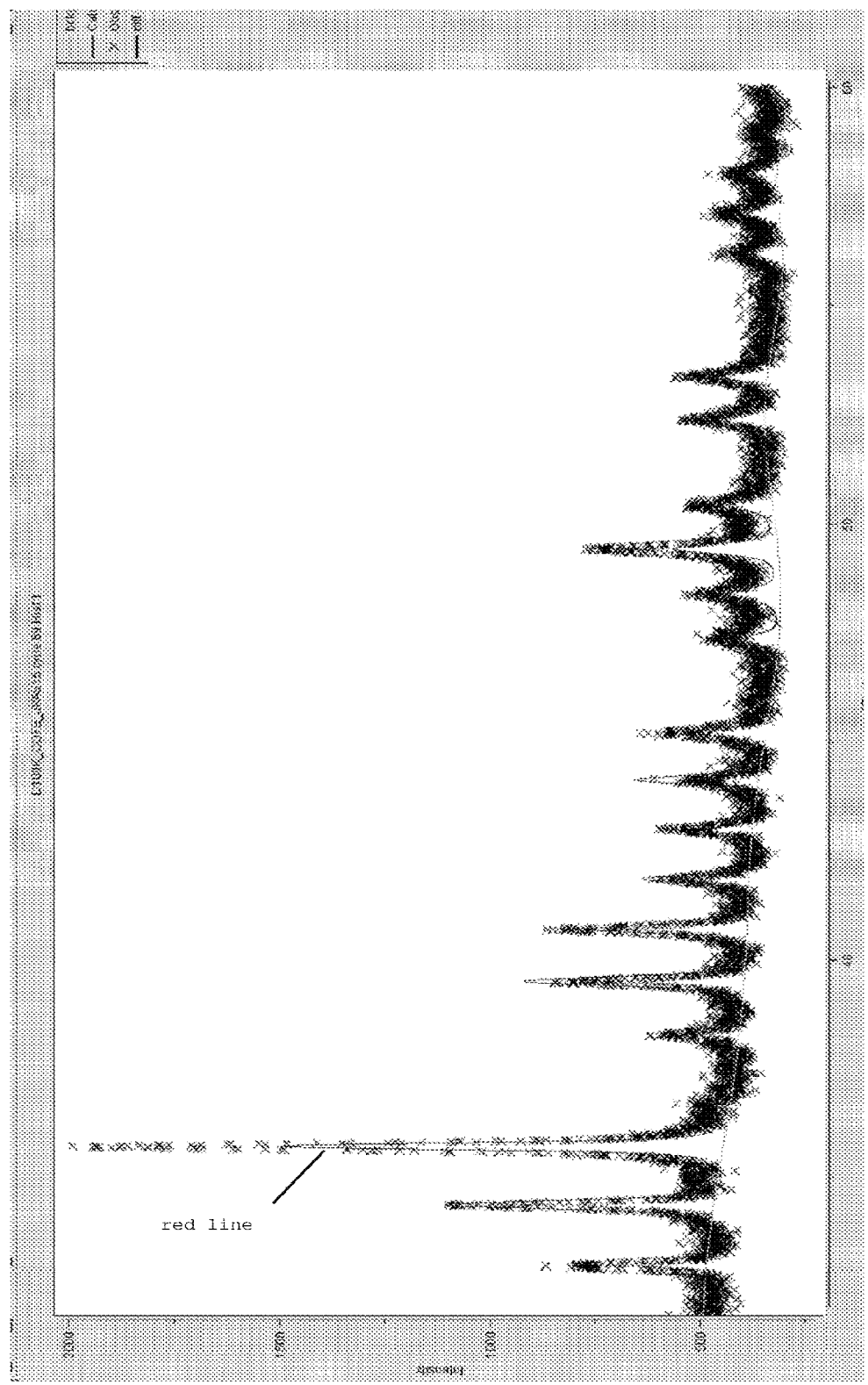

In some embodiments, the co-ordination frameworks comprising complexes of Formula (I), (II), (III) or (IV), where M is selected from Cu, have an elongated tetragonal toplogy P4/mmm. The structure depicted in FIG. 6 is the tetragonal P4/mmm structure of Cu$^{II}_2$[Fe$^{II}$(CN)$_6$].

Synthesis

In some embodiments, the co-ordination frameworks comprising complexes of Formula (I), (II), (III) or (IV) may prepared by contacting a first aqueous solution comprising a V$^{2+}$, Cr$^{2+}$, Mn$^{2+}$, Fe$^{2+}$, Co$^{2+}$, Ni$^{2+}$, Cu$^{2+}$, Zn$^{2+}$, Ru$^{2+}$, Rh$^{2+}$, Pd$^{2+}$ or Pt$^{2+}$ salt (i.e M$^{II}$, M being in the +2 oxidation state) with a second aqueous solution comprising a lithium, sodium, potassium, beryllium, magnesium or calcium salt, especially a lithium, sodium or potassium salt, of [Fe$^{II}$(CN)$_6$]$^{4-}$ or [Ru$^{II}$(CN)$_6$]$^{4-}$ under conditions which maintain a diffusion zone between the first aqueous solution and the second aqueous solution for a time of in excess of 1 day.

As used herein, the term "diffusion zone" refers to a zone where the first aqueous solution contacts and mixes with the second aqueous solution, wherein the first and second aqueous solutions outside the diffusion zone have not yet mixed.

The co-ordination framework comprising complexes of Formula (I), (II), (III) or (IV) is formed in the diffusion zone.

By allowing the first and second aqueous solutions to slowly mix at the diffusion zone, co-ordination frameworks comprising complexes of Formula (I), (II), (III) or (IV) having high crystallinity may be prepared. Typically, the diffusion zone is maintained for a period of at least 2 weeks, e.g. at least 3 weeks, at least 4 weeks or at least 6 weeks. Typically, the diffusion zone is at a temperature of from about 10° C. to about 50° C., e.g. from about 10° C. to about 40° C., from about 15° C. to about 40° C., from about 15° C. to about 30° C., from about 20° C. to about 30° C. or from about 20° C. to about 25° C. In some embodiments, it may be advantageous to maintain the diffusion zone within ±5° C. while the first and second aqueous solutions mix.

Accordingly, in another aspect, the invention provides a method of preparing a co-ordination framework comprising complexes of Formula (IV)

$$A_x(M_2[M'(CN)_6])$$  Formula (IV)

wherein

A is selected from Li$^+$, Na$^+$, K$^+$, Be$^{2+}$, Mg$^{2+}$ and Ca$^{2+}$, especially Li$^+$, Na$^+$ and K$^+$, M is selected from V, Cr, Mn, Fe, Co, Ni, Cu, Ag, Au, Zn, Ru, Rh, Pd and Pt, especially Cr, Mn, Fe, Co, Ni, Cu, Zn, Ru and Rh, M' is selected from Fe and Ru, 0<x≤8, A is located in the pores of the framework; and wherein the method comprises contacting a first aqueous solution comprising M$^{II}$ with a second aqueous solution comprising a lithium, sodium or potassium salt of [Fe$^{II}$(CN)$_6$]$^{4-}$ or [Ru$^{II}$(CN)$_6$]$^{4-}$, under conditions which maintain a diffusion zone between the first aqueous solution and the second aqueous solution for a time of in excess of 1 day.

Such a method typically forms a co-ordination framework comprising complexes of Formula (IV), wherein M and M' are in the +2 oxidation state (i.e. A$_x$(M$_2^{II}$[M'$^{II}$(CN)$_6$]).

In some embodiments, the co-ordination framework comprising complexes of Formula (IV) prepared by the method is crystalline. In some embodiments, the co-ordination framework comprising complexes of Formula (IV) prepared by the method is highly crystalline.

In some embodiments, the reaction may be carried out in an H-cell. An H-cell is a reaction vessel comprising two reservoirs with a fluid connection between the reservoirs. The fluid connection is generally a horizontal connection between the reservoirs. The H-cell is typically in a similar form to the capital letter H with the reservoirs in vertical chambers on either side of the cell, and a generally horizontal section connecting the two reservoirs. By placing the first aqueous solution in one of the reservoirs and the second aqueous solution in the other reservoir, the first aqueous solution and the second aqueous solution are brought into contact and form a diffusion zone in the generally horizontal fluid connection between the two reservoirs. Such a system may allow for the maintenance of a diffusion zone (between the first aqueous solution and the second aqueous solution) for in excess of 1 day, for example, in excess of 2 days, 3 days, 4 days, 5 days, 6 days, 1 week, 2 weeks, 3 weeks, 1 month, 2 months or 6 months.

In some embodiments, maintaining a low concentration of $M^{II}$ and/or $[M'(CN)_6]^{4-}$ in the diffusion zone allows co-ordination frameworks to be produced that have improved/increased crystallinity compared to co-ordination frameworks produced by prior art methods.

Figure 3:
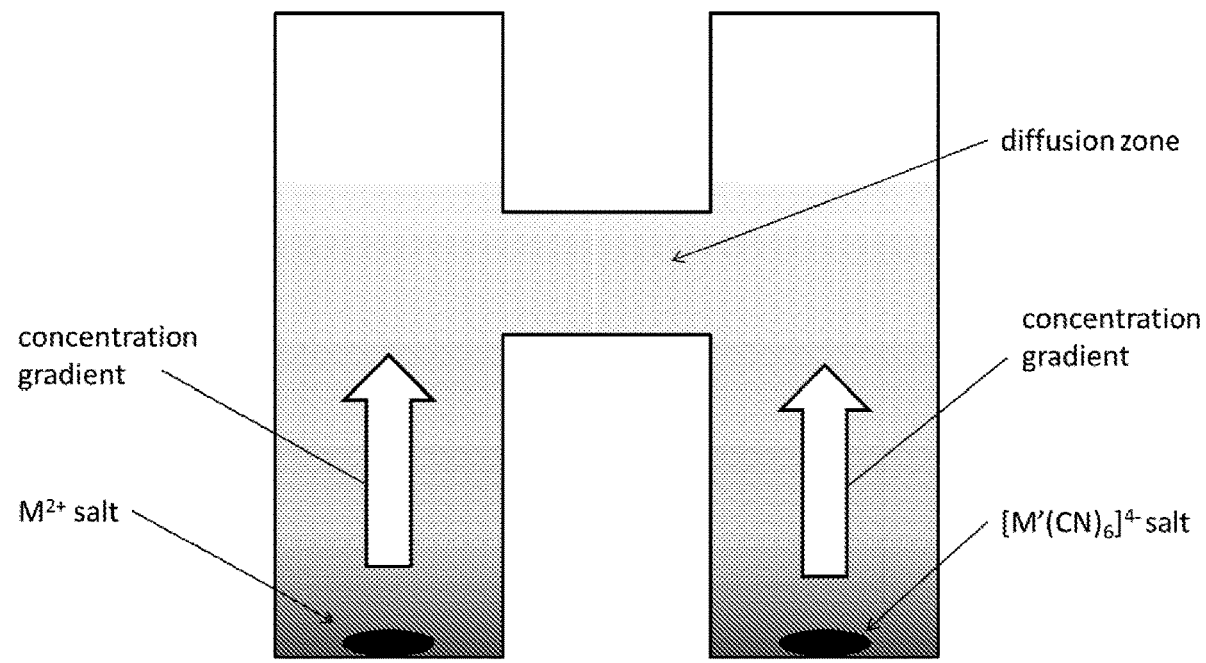
FIG. 3 is a schematic of an H-cell which was used to make co-ordination frameworks of Formula (I), (II), (III) or (IV) as described in the Examples.

To maintain a low concentration of $M^{II}$ and $[M'(CN)_6]^{4-}$ in the diffusion zone, a "slow diffusion" method may be employed. In an embodiment of a "slow diffusion" method (the schematic for which is depicted in FIG. 3), an $M^{2+}$ salt in the solid state is added to one reservoir of an H-cell, and a salt of $[M'(CN)_6]^{4-}$, also in the solid state, is added to the other reservoir of the H-cell. Solvent is then added to each of the reservoirs so as to minimise disturbance of the solids. Disturbance of the solid may be minimised by, for example, slow addition of the solvent with minimal mixing/turbulence (e.g. addition of solvent at a rate of less than about 50 μL per second for a reaction containing about 50 mL solvent in total). In each reservoir, the solvent in contact with the solid material will slowly dissolve the solid material, forming non-homogenous solutions having a concentration gradient. The gradient is such that towards the top of the reservoir, and where the diffusion zone lies, the concentration of $M^{2+}$ and $[M'(CN)_6]^{4-}$ is zero (or near zero), and the concentration of $M^{2+}$ at the bottom of one reservoir (where the solid $M^{2+}$ resides) and the concentration of $[M'(CN)_6]^{4-}$ at the bottom of the other reservoir (where the solid $[M'(CN)_6]^{4-}$ resides), is high. Over time, the frontier of each solution travels entropically toward the diffusion zone. Accordingly, over time the first solution frontier (comprising the $M^{2+}$) and the second solution frontier (comprising the $[M'(CN)_6]^{4-}$) slowly diffuse and eventually make contact in the diffusion zone, whereupon the $M^{2+}$ and $[M'(CN)_6]^{4-}$ (each in a very low concentration) then react over time to form co-ordination frameworks comprising complexes of Formula (I), (II), (III) or (IV) having high crystallinity (e.g. in the form of a powder with a high proportion of microcrystalites). The molar ratio of the starting materials $M^{2+}:[M'(CN)_6]^{4-}$ may be varied. Typically, the molar ratio of $M^{2+}:[M'(CN)_6]^{4-}$ varies from about 3:1 to about 1:3 (e.g. about 3:1 to about 1:1, about 2:1 to about 1:1, about 2:1 to about 1:2, about 2:1 or about 1:1).

The resultant co-ordination framework may be collected from the diffusion zone by, for example, filtration or collection of the precipitate (e.g. microcrystalites). The co-ordination framework may then be washed, e.g. by deionised water washes and separation of supernatant, e.g. by centrifuge (which may be used to separate the microcrystallites from amorphous material). The washing procedure may be repeated multiple times.

Additional lithium, sodium, potassium, beryllium, magnesium or calcium, especially lithium, sodium or potassium, in the form of lithium, sodium, potassium, beryllium, magnesium or calcium salts may be included in the first aqueous solution, the second aqueous solution or both aqueous solutions in order to vary the content of these ions in the resultant co-ordination framework. Examples of suitable lithium, sodium or potassium salts include lithium, sodium or potassium halides (e.g. Cl, Br or I, such as LiCl, LiBr, NaCl, NaBr, KCl and KBr). Other examples of suitable lithium, sodium, potassium, beryllium, magnesium or calcium salts include nitrates (e.g. $LiNO_3$, $NaNO_3$, KNOB, $Be(NO_3)_2$, $Mg(NO_3)_2$ and $Ca(NO_3)_2$). Examples of other suitable lithium, sodium, potassium, beryllium, magnesium or calcium salts, especially lithium, sodium or potassium salts, include the counterions sulphate ($SO_4^{2-}$), carbonate ($CO_3^{2-}$), acetate ($CH_3COO^-$), trifluoromethanesulfonate(triflate) ($CF_3SO_3^-$), nitrate ($NO_3^-$), hexafluorophosphate ($PF_6^-$), hexafluoroarsenate ($AsF_6^-$), hydroxide ($OH^-$), metaborate ($BO_2^-$), tetraborate ($B_4O_7^{2-}$), tetrachloroaluminate ($AlCl_4^-$), tetrachloroaurate ($AuCl_4^-$), tetrachlorogallate ($GaCl_4^-$), tetrachloropalladate($PdCl_4^{2-}$), tetrafluoroborates ($BF_4^-$) and thiocyanates ($SCN^-$), for example, potassium sulphate ($K_2SO_4$), lithium carbonate ($Li_2CO_3$) or sodium acetate ($CH_3COONa$). The molar ratio of $A:[M'(CN)_6]^{4-}$ may be varied. Typically, the molar ratio of $A:[M'(CN)_6]^{4-}$ varies from about 4:1 to about 1:4 (e.g. about 4:1 to about 1:1, about 1:1 to about 1:4, about 3:1 to about 1:3, about 3:1 to about 1:1, about 1:1 to about 1:3, about 2:1 to about 1:2, about 2:1 to about 1:1, about 1:1 to about 1:2, about 2:1 or about 1:1).

Co-ordination frameworks comprising complexes of Formula (I), (II), (III) or (IV) are typically prepared in the $M^{II}/M'^{II}$ oxidation state (i.e. M is in the +2 oxidation state and M' is in the +2 oxidation state). Co-ordination frameworks comprising complexes of Formula (I), (II), (III) or (IV) in the $M^{II}/M'^{II}$ oxidation state are redox active and may be converted to other oxidation state combinations (e.g. $M^{II}/M'^{III}$, or) using electrochemical methods (e.g. by contacting the material and an electrode and applying a voltage/charge to the material via the electrode). Alternatively, other methods may be used to alter the redox state of the co-ordination frameworks comprising complexes of Formula (I), (II), (III) or (IV), for example, chemical methods or methods that involve the application of an electric field. Advantageously, such methods may be used to alter the redox state of the co-ordination frameworks comprising complexes of Formula (I), (II), (III) or (IV) whilst maintaining the structural integrity of the framework. In some embodiments, the co-ordination frameworks comprising complexes of Formula (I), (II), (III) or (IV) are initially prepared in the $M^{II}/M'^{II}$. II oxidation state, as doing so can provide advantageous properties. For example, co-ordination frameworks comprising complexes of Formula (I), (II), (III) or (IV) in the $M^{II}/M'^{II}$ oxidation state can have increased porosity, increased charge capacity (as measured by the amount of guest ions packed into the pores) and/or increased thermal stability, relative to other co-ordination frameworks. Such co-ordination frameworks comprising complexes of Formula (I), (II), (III) or (IV) in the $M^{II}/M'^{II}$ oxidation state can subsequently be subjected to further manipulations (e.g. redox reactions) in order to construct co-ordination frameworks comprising complexes of Formula (I), (II), (III) or (IV) in other oxidation state combinations (e.g. $M^{II}/M'^{III}$, $M^{III}/M'^{II}$ or $M^{III}/M'^{III}$) that maintain at least some of the porosity, charge capacity and/or thermal stability properties of the initial $M^{II}/M'^{II}$ framework.

The co-ordination frameworks comprising complexes of Formula (I), (II), (III) or (IV) may be subjected to further synthetic manipulations. For example, the co-ordination frameworks comprising complexes of Formula (I), (II), (III) or (IV) can be modified through a process referred to herein as "post-synthetic modification". This process, and the products of this process (sometimes referred to herein as "post-synthetically modified frameworks" or "post-synthetically modified derivatives"), are discussed later under the heading "Post-synthetic modification".

The co-ordination frameworks comprising complexes of Formula (I), (II), (III) or (IV), and post-synthetically modified derivatives thereof, are typically prepared in the form of powders. As a person skilled in the art will appreciate, such powders may be transformed into other forms by processes known in the art. For example, a solid material may be obtained from a powder by packing the powder into a press or a mold.

Ion and Gas Capture

The co-ordination frameworks comprising complexes of Formula (I), (II), (III) or (IV), as well as post-synthetically modified frameworks, are redox active and porous and have a number of internal sites which can capture various guests, for example gases, solvents (including volatile solvents) and/or ions (e.g. metal ions). Co-ordination frameworks which have high crystallinity tend to have a higher porosity and significantly larger capacity to capture guests. High crystallinity of the framework is an important feature driving porosity, and therefore the capacity to sorb guests. Co-ordination frameworks having high crystallinity have both long and short range ordering of atoms, which is thought to be advantageous for the efficient flow of guests into and out of the pores/channels of the co-ordination framework. The rationale for this is that if the framework is not crystalline, or only exhibits some short range ordering (as evidenced by one or more of: (i) broadening of peaks in X-ray diffraction spectra; (ii) low intensity peaks in X-ray diffraction pattern; or (iii) only peaks at low Q/low angle (i.e. no higher angle peaks) in X-ray diffraction spectra), then guests can only travel a short distance into the framework, and thus the functionality of the framework rapidly reduces as, in theory, the pores/channels further from the surface of the material may not be exploited.

Depending on the guest, the co-ordination framework may need to be desolvated or dehydrated to adsorb guests into the pores (dehydration being to remove residual water from the framework remaining from the synthesis of the framework). For example, ion sorption and desorption can typically occur without desorption of the residual water or other solvent from the framework, whereas gas sorption (including, but not limited to, $H_2$, $CO_2$, $O_2$, $NO_2$, $CH_4$, $N_2$, ethane, ethene, ethyne, propane, butane, and CO) typically requires desorption of the residual water or other solvent from the framework prior to sorption of the gas.

The co-ordination frameworks comprising complexes of Formula (I), (II), (III) or (IV) typically have a high affinity for one or more of $CH_4$, $CO_2$, $O_2$ and $H_2$, especially $CO_2$ and $H_2$, and can be used to capture these gases. Typically, the gases are captured by exposing the co-ordination framework to an atmosphere comprising the gas.

Some of the co-ordination frameworks comprising complexes of Formula (I), (II), (III) or (IV) also have affinity for small chain hydrocarbons, such as methane, ethane, ethylene or acetylene, and can be used to capture these gases.

Accordingly, in one aspect, the present invention provides a method of capturing or adsorbing a gas (e.g. $H_2$, $CO_2$, $O_2$, CO, $NO_2$, NO, $N_2O_4$, $CH_4$, $N_2$, ethane, ethene, ethyne, propane or butane, especially $H_2$, $CO_2$, $O_2$, CO, $NO_2$, $CH_4$, $N_2$, ethane, ethene, ethyne, propane or butane), the method comprising contacting a co-ordination framework comprising complexes of Formula (I), (II), (III) or (IV) and the gas to be captured or adsorbed. In another aspect, the present invention provides the use of a co-ordination framework comprising complexes of Formula (I), (II), (III) or (IV) in the capture or absorption of a gas (e.g. $H_2$, $CO_2$, $O_2$, CO, $NO_2$, NO, $N_2O_4$, $CH_4$, $N_2$, ethane, ethene, ethyne, propane or butane, especially $H_2$, $CO_2$, $O_2$, CO, $NO_2$, $CH_4$, $N_2$, ethane, ethene, ethyne, propane or butane). In another aspect, the present invention provides the use of a co-ordination framework of Formula (I), (II), (III) or (IV) in the storage of a gas (e.g. $H_2$, $CO_2$, $O_2$, CO, $NO_2$, NO, $N_2O_4$, $CH_4$, $N_2$, ethane, ethene, ethyne, propane or butane, especially $H_2$, $CO_2$, $O_2$, CO, $NO_2$, $CH_4$, $N_2$, ethane, ethene, ethyne, propane or butane).

Similarly, the post-synthetically modified co-ordination frameworks (i.e. a co-ordination framework comprising complexes of Formula (I), (II), (III) or (IV) that has been subjected to post-synthetic modification) can be used to capture or adsorb various gases. The post-synthetic modification may also be used to change the gas selectivity of the co-ordination framework. The selectivity towards a particular gas is typically dependent on the ligand used for PSM (i.e. the "pore surface modifying agent" as described below under the heading "Post-synthetic modification"). When co-ordinatively bonded to the framework, the ligand (i.e. "pore surface modifying agent") changes the gas selectivity of the framework. Accordingly, ligands (i.e. "pore surface modifying agents") may be selected to adjust the gas selectivity of the framework to provide a framework having a desired selectivity. A post-synthetically modified framework may, for example, be used to store $CO_2$, $N_2$, $H_2$, $O_2$, $CH_4$, $C_2H_2$, $C_2H_6$, $C_2H_4$, $C_3H_8$, $C_4H_{10}$, and other gases including high volatility organic solvents. Other gases may include, for example, NO and $N_2O_4$.

Accordingly, in one aspect, the present invention provides a method of capturing or adsorbing a gas (e.g. $H_2$, $CO_2$, $O_2$, CO, $NO_2$, NO, $N_2O_4$, $CH_4$, $N_2$, ethane, ethene, ethyne, propane or butane, especially $H_2$, $CO_2$, $O_2$, CO, $NO_2$, $CH_4$, $N_2$, ethane, ethene, ethyne, propane or butane), the method comprising contacting a post-synthetically modified framework and the gas to be captured or adsorbed. In another aspect, the present invention provides the use of a post-synthetically modified framework in the capture or absorption of a gas (e.g. $H_2$, $CO_2$, $O_2$, CO, $NO_2$, NO, $N_2O_4$, $CH_4$, $N_2$, ethane, ethene, ethyne, propane or butane, especially $H_2$, $CO_2$, $O_2$, CO, $NO_2$, $CH_4$, $N_2$, ethane, ethene, ethyne, propane or butane). In another aspect, the present invention provides the use of a post-synthetically modified framework in the storage of a gas (e.g. $H_2$, $CO_2$, $O_2$, CO, $NO_2$, NO, $N_2O_4$, $CH_4$, $N_2$, ethane, ethene, ethyne, propane or butane, especially $H_2$, $CO_2$, $O_2$, CO, $NO_2$, $CH_4$, $N_2$, ethane, ethene, ethyne, propane or butane).

The co-ordination frameworks of the present invention (including post-synthetically modified derivatives thereof) can be tuned to change their porosity and affinity for guests. The frameworks tend to vary with different ion incorporation and it is believed that as the quantity and/or size of ions increases, the pore volume decreases. The ions can have an effect on the affinity for certain guests (e.g. gases and ions).

Electric fields can, in some embodiments, be used to change the gas sorption properties and release the gas when it is needed. Gases may, in various embodiments, also be released through changes in temperature, changes in pressure, changes in magnetic fields, changes in electric fields or through guest substitution (i.e. the introduction of other gases or solvents into the pore space).

In some embodiments, co-ordination frameworks comprising complexes of Formula (I), (II), (III) or (IV), and post-synthetically modified frameworks, may be used in one or more of:

1. $H_2$ gas storage for energy storage in vehicles or for $H_2$ energy storage for domestic and industrial power storage.
2. Organic (gases containing carbon) gases for high purity safe insertion of these gases into chemical/industrial/medical processes.
3. Pure or mixture gas storage for space exploration and underwater exploration.
4. CO storage for catalysis.

Preliminary results indicate that these framework materials range in porosity (as assessed by Brunauer-Emmett- Teller (BET) surface area using N2 Isotherm) from about 600 m$^2$/g to about 1200 m$^2$/g. The porosity of the materials may be tuned (e.g. increased) through different variations in the formulations. Varying the formulation may require a balance between the benefits of increased K/Na/Li when synthesising the material (yielding a framework with more vacancies), and including too much K/Na/Li when synthesising the material (yielding a framework wherein the K/Na/Li themselves take up space in the pores/channels). Porosity is also dependent on the coordinating metals in the framework (i.e. M and M'), as these have an effect on the bond length, and therefore the dimensions of the pores/channels. Larger pores/channels yields greater porosity, and thus, the ability to add more, or larger, cations (or other guests) to generate more vacancies without sacrificing all the available pore space. Some materials show a strong affinity for $H_2$, while others show a strong affinity for $H_2$, $CO_2$, $O_2$, $NO_2$, $CH_4$, $N_2$, ethane, ethene, ethyne, propane, butane, CO. Affinity may, for example, be determined using a calculation of isosteric heat of adsorption for each gas in each framework with BET isotherm experiments undertaken at 3 different temperatures. Some materials show a strong affinity for $H_2$ (e.g. Ni[Ru(CN)$_6$] and Ni[Fe(CN)$_6$), while others show a strong affinity for $H_2$ and/or $CO_2$ (e.g. Cu[Ru(CN)$_6$] and Cu[Fe(CN)$_6$]).

Similarly, the co-ordination frameworks comprising complexes of Formula (I), (II), (III) or (IV), and post-synthetically modified frameworks, typically have an affinity for various ions and may be used to capture and release these ions. Typically, the capture of the ions is performed by contacting the co-ordination framework with a solution comprising the ion. Accordingly, in one aspect, the present invention provides a method of capturing and/or releasing an ion (e.g. one or more ions selected from ions of Li, Na, K, Be, Mg, Al, Ca, V, Cr, Mn, Fe, Co, Ni, Cu, Zn, Ga, Ge, Zr, Ru, Rh, Pd, Au, Ag, Pt, Cd, In, Sn, Sb, Bi, Pb, Hg and Ir, especially one or more ions selected from ions of Li, Na, K, Al, Be, Mg and Ca), the method comprising contacting a co-ordination framework comprising complexes of Formula (I), (II), (III) or (IV), or a post-synthetically modified framework, and a solution comprising the ion to be captured. In another aspect, the present invention provides the use of a co-ordination framework comprising complexes of Formula (I), (II), (III) or (IV), or a post-synthetically modified framework, in the capture and/or release of an ion (e.g. one or more ions selected from ions of Li, Na, K, Be, Mg, Al, Ca, V, Cr, Mn, Fe, Co, Ni, Cu, Zn, Ga, Ge, Zr, Ru, Rh, Pd, Au, Ag, Pt, Cd, In, Sn, Sb, Bi, Pb, Hg and Ir, especially one or more ions selected from ions of Li, Na, K, Al, Be, Mg and Ca). In another aspect, the present invention provides the use of a co-ordination framework comprising complexes of Formula (I), (II), (III) or (IV), or a post-synthetically modified framework, in the storage of an ion (e.g. one or more ions selected from ions of Li, Na, K, Be, Mg, Al, Ca, V, Cr, Mn, Fe, Co, Ni, Cu, Zn, Ga, Ge, Zr, Ru, Rh, Pd, Au, Ag, Pt, Cd, In, Sn, Sb, Bi, Pb, Hg, Ir, especially one or more ions selected from ions of Li, Na, K, Al, Be, Mg and Ca).

In another aspect, the present invention provides a co-ordination framework comprising complexes of Formula (I), (II), (III) or (IV), or a post-synthetically modified derivative thereof, wherein the framework comprises an ion in a pore of the framework, wherein the ion is selected from ions of Li, Na, K, Be, Mg, Al, Ca, V, Cr, Mn, Fe, Co, Ni, Cu, Zn, Ga, Ge, Zr, Ru, Rh, Pd, Au, Ag, Pt, Cd, In, Sn, Sb, Bi, Pb, Hg, Ir, especially one or more ions selected from ions of Li, Na, K, Al, Be, Mg and Ca, more especially one or more ions selected from ions of Li, Na and K. In some embodiments, the ion is in the +1, +2, +3, +4 or +5 state, especially the +1, +2 or +3 state, more especially the +1 or +2 state.

Thermal Expansion

Zero Thermal Expansion (ZTE) and Negative Thermal Expansion (NTE) are physicochemical properties whereby materials either do not undergo dimensional change or contract upon heating, rather than expanding as most materials do. ZTE and NTE materials have received increasing interest over the past three decades for a variety of uses domestically (e.g. in thermally resistant kitchenware) and industrially (e.g. in electronic devices, heat engine components, heat resistant auto-parts and a wide variety of aerospace technologies). Commercial ZTE and NTE technologies have largely been ceramic based with LAS systems ($Li_2O$—$Al_2O_3$—$SiO_2$) dominating both the kitchenware and aerospace engineering industry.

Materials which exhibit isotropic ZTE and NTE over a wide temperature range including room temperature have a wide range of practical applications. The isotropic property is significant because it addresses two major industrial issues:

Many current commercial thermal shock materials suffer from fatigue and stress. While the bulk ceramic appears to exhibit ZTE, on the nanoscale each crystallite exhibits anisotropic thermal expansion leading to 'cracking' along the microcrystallite interface.

New applications for isotropic ZTE or NTE over a wide temperature range are appearing in various fields such as thin films, quantum computing, energy storage and microelectronics.

Very few oxide materials exhibit isotropic NTE over a wide temperature range, which includes room temperature, and none exhibit isotropic ZTE. $ZrW_2O_8$ is the current record holder for isotropic NTE over the largest temperature range with two different phases of NTE from 25-400 K ($\alpha$=$-8.7 \times 10^{-6}$ K$^{-1}$) and 500-1000 K ($\alpha$=$-4.7 \times 10^{-6}$ K$^{-1}$).

The past decade has seen significant growth in the field of co-ordination frameworks/metal organic frameworks (MOFs) owing to their enormous structural and chemical diversity yet the phenomenon of isotropic zero (ZTE) and negative (NTE) thermal expansion over a broad temperature range remains extremely rare. For MOF materials, the mechanisms for anomalous expansion include electronic and magnetic transitions, and transverse atomic and molecular vibrations.

The co-ordination frameworks of the present invention comprise a 3-D cyanido-bridged co-ordination framework which is believed to have increased vibrational flexibility of the diatomic —CN— linker compared with other bridging systems, such as seen in metal oxides.

The cyanido-bridge is a unique ligand. It is the strongest in crystal field strength of known monodentate ligands, enabling fast, low energy input synthesis. The cyanido-bridge displays versatile electronic properties via its simultaneous σ-donor/π-acceptor (i.e. π-backbonding) system, which enables metal-to-metal communication, such as long range ordering of spin states, or intervalence charge transfer (IVCT) in mixed valent compounds. It is also a relatively small ligand, which limits the structural possibilities when bringing multiple secondary building units (SBUs) together during one-step co-ordination framework synthesis, thereby creating predictable morphologies. The cyanido ligand is also flexible, making it ideal to simultaneously facilitate electronic activity, magnetic cooperativity and anomalous thermal expansion properties.

In some embodiments, the co-ordination frameworks comprising complexes of Formula (I), (II), (III) or (IV), or post-synthetically modified frameworks, that have useful thermal properties are desolvated.

For example, in some embodiments partially or entirely desolvated crystalline co-ordination frameworks comprising complexes of Formula (I), (II), (III) or (IV), where M' is Ru, exhibit zero or negative thermal expansion over a wide temperature range. In some embodiments, where M' is Ru, the partially or entirely desolvated crystalline co-ordination frameworks comprising complexes of Formula (I), (II), (III) or (IV) exhibit zero or negative thermal expansion over a temperature range of 0-700 k. The co-ordination frameworks comprising complexes of Formula (I), (II), (III) or (IV) generally need to be more than about 90% desolvated in order to exhibit such thermal expansion properties. Without wishing to be bound by theory, it is believed that having water molecules in the pores of the framework applies a positive internal pressure within the framework, counteracting the NTE thermal effects/vibrations. The thermal expansion behaviour of co-ordination frameworks comprising complexes of Formula (I), (II), (III) or (IV) is less predictable when the framework includes solvent in the pores of the framework (e.g. sorbed water). To avoid or mitigate unpredictable thermal expansion, it is generally preferable to desolvate (e.g. desorb water/dry the material) as much as possible to exhibit consistent ZTE or NTE properties. Desolvation may be achieved by subjecting the materials to reduced pressure and/or increased temperature.

In some embodiments, desolvating crystalline frameworks comprising complexes of Formula (I), (II), (III) or (IV), where M is Cu, provides materials having positive or negative thermal expansion.

The materials that exhibit ZTE between 100-600 K may have application in lattices on which to deposit thin film solar voltaic (to protect the film from microcracking as a result of exposure to extreme heat/cold), to replace batteries which are used under extreme heat conditions (such as in phones) and to provide ZTE properties to high precision devices including scientifically calibrated instruments, high precision medical devices, lasers (which generate large amounts of heat), induction electric engines, stoves/benchtops.

The coordination frameworks of the present invention (including co-ordination frameworks comprising complexes of Formula (I), (II), (III) or (IV), or post-synthetically modified derivatives thereof) have an array of properties that make them useful for various functions or applications. They may thus be referred to as multifunctional materials. In some embodiments, the coordination framework of the present invention possesses one or more properties that make it useful for one or more particular functions or applications. For example, the material may display properties such as ZTE, NTE, PTE, semi-conductive properties, conductive properties, capacitive properties, charge storage/release, gas storage/release, guest storage/release, separations, filtrations or redox activity. In some embodiments, the material possesses one of these properties as a defining characteristic. In other embodiments, the material possesses two or more (e.g. three, four, five or six) of these properties as defining characteristics.

The coordination frameworks of the present invention may be used as single function or multifunctional components that involve the movement of ions (e.g. electrons), such as electronic devices (e.g. in computers or computational devices). In some embodiments, the naturally high capacitance of the materials, combined with their semi or full conductivity and ability to adsorb and release ions, makes them useful as storage devices (e.g. batteries) and as constituents in a range of computing components.

Post-Synthetic Modification

The co-ordination frameworks comprising complexes of Formula (I), (II), (III) or (IV) can be modified through a process referred to herein as "post-synthetic modification" which affords materials referred to herein as "post-synthetically modified frameworks".

In the post-synthetic modification process, a "pore surface modifying agent" (sometimes referred to herein as PSMA or "pore surface modifier") is introduced into the pores of a co-ordination framework comprising complexes of Formula (I), (II), (III) or (IV), where it binds to one or more metal centres of the coordination framework and has the effect of modifying the surface properties of a pore.

When the pore surface modifying agent has been introduced into the co-ordination framework comprising complexes of Formula (I), (II), (III) or (IV), the pore surface modifying agent modifies the surface properties of the pore. These properties may include the chemical properties as well as physical properties. For example, the PSMA may increase or decrease the hydrophobicity of the pore surface, increase or decrease the hydrophilicity of the pore surface, increase or decrease the ionicity of the pore surface, add functional groups (e.g. reactive functional groups) to the pore surface. For example, a pore surface modifying agent may be selected to increase affinity towards: (1) specific elements, (2) molecules based on their electronegativity, (3) molecules based on polarity, (4) organic molecules containing n-bonds, (5) organic molecules containing conjugated n-systems, and/or (6) organic molecules having specific functional groups (e.g. containing heteroatoms such as S, N, O and F) through dipole-dipole or hydrogen bonding interactions unique to those functional groups. The pore surface modifying agent may also increase or (more typically) decrease the pore size, impede the movement of guests through the pores/channels (e.g. by steric effects, covalent or non-covalent bonding), or facilitate the movement of guests through the pores/channels. In some embodiments, a bulky (i.e. sterically demanding) pore surface modifying agent may be used to reduce negative thermal expansion behaviour towards zero thermal expansion behaviour. It is believed that this change in behaviour is due, at least in part, to sterically hindering phonon vibrational modes.

Post-synthetic modification can change the properties of the co-ordination framework, for example, increasing or decreasing the affinity for certain guests, increasing or (more typically) decreasing the porosity of the co-ordination framework. Post-synthetic modification may also be used to (1) increase the thermal stability of the overall framework, (2) increase the chemical resistivity of the overall framework (e.g. resistance to extremely acidic or basic environments), and/or (3) change the electronic and/or magnetic properties of the overall material.

The "pore surface modifying agent" is typically introduced into the pores of a co-ordination framework comprising complexes of Formula (I), (II), (III) or (IV) by contacting the "pore surface modifying agent" and the co-ordination framework comprising complexes of Formula (I), (II), (III) or (IV). These may be contacted by any means, for example, adding the "pore surface modifying agent" to a vessel containing the co-ordination framework comprising complexes of Formula (I), (II), (III) or (IV), or adding the co-ordination framework comprising complexes of Formula (I), (II), (III) or (IV) to a vessel containing the "pore surface modifying agent". The "pore surface modifying agent" may be in solid form or in solution. In some embodiments, the "pore surface modifying agent" is in a fluid form, for example, a liquid, gas or dissolved in a solvent (i.e. solution). The co-ordination framework comprising complexes of Formula (I), (II), (III) or (IV) may be in solid form or in solution. Solutions may be aqueous solutions or solutions in organic solvents (e.g. THF, ethanol (EtOH), methanol (MeOH), isopropanol, acetonitrile, toluene, phenol, benzonitrile). The solvent is preferably selected so as to minimise competition with the PSMA.

The pore surface modifying agent comprises a metal binding group covalently bound to a pore modifying group, optionally via a linker. When present, the linker is covalently bound to the metal binding group and covalently bound to the pore modifying group.

The pore surface modifying agent may comprise 1, 2, 3 or 4 metal binding groups, which are each independently optionally covalently bound to a linker.

The pore surface modifying agent may comprise 1, 2, 3 or 4 pore modifying groups, which are each independently optionally covalently bound to a linker.

The linker, when present, may be covalently bound to 1, 2, 3 or 4 metal binding groups and/or 1, 2, 3 or 4 pore modifying groups.

In some embodiments, the metal binding group also functions as a pore surface modifying group. That is, in some embodiments the metal binding group is a pore surface modifying group (e.g. ammonia or pyridine).

In some embodiments, the metal binding group is covalently bound directly to the pore modifying group (i.e. there is no linker).

A "metal binding group" is a functional group that binds to a metal. Useful examples include functional groups containing nitrogen, oxygen and/or sulphur, such as —NH—, —NH$_2$, —NHC$_{1-3}$-alkyl, —N(C$_{1-3}$-alkyl)(C$_{1-3}$-alkyl), —OH, —OC$_{1-3}$-alkyl, —COOH, —COOC$_{1-3}$-alkyl, —SH, —SC$_{1-3}$-alkyl, —(CO)NH$_2$, —(CO)NHC$_{1-3}$-alkyl, —(CO)N(C$_{1-3}$-alkyl)(C$_{1-3}$-alkyl), and heterocycles such as imidazole, morpholine, pyrimidine, pyridine, piperidine, pyrrole, pyrolidine, thiazole, thiophene, furan and tetrahydrofuran. Especially useful metal binding groups include diamine-based ligands, such as H$_2$N(CH$_2$)$_2$NH$_2$, H$_2$N(CH$_2$)$_3$NH$_2$, H$_2$N(CH$_2$)$_4$NH$_2$, H$_2$N(CH$_2$)$_5$NH$_2$, H$_2$N(CH$_2$)$_6$NH$_2$, H$_2$N(CH$_2$)$_7$NH$_2$ or H$_2$N(CH$_2$)$_8$NH$_2$. For example, ethylenediamine (en), has displayed efficient CO$_2$ capture in some examples. The metal binding group is covalently bound to a linker (when present) or the pore modifying group (unless the metal binding group is also the pore modifying group).

A "pore modifying group" is a functional group that is capable of interacting with a guest by chemical and/or steric interactions. Examples of chemical interactions include hydrophobic interactions, hydrophilic interactions, fluorophilic interactions, fluorophobic interactions, ionic interactions, covalent bonding interactions, van der Waals interactions, London dispersion forces, hydrogen bonding and n-n interactions (e.g. n-n stacking). Examples of pore modifying groups include —H, —NH$_2$, —NHC$_{1-3}$-alkyl, —N(C$_{1-3}$-alkyl)(C$_{1-3}$-alkyl), —OH, —OC$_{1-3}$-alkyl, —CHO, —COOH, —COOC$_{1-3}$-alkyl, —C(O)C$_{1-3}$-alkyl, —SH, —SC$_{1-3}$-alkyl, mono- or polyfluorinated C$_{1-10}$-alkyl groups, phenyl, phenyl substituted with 1, 2, 3, 4 or 5 groups each independently selected from —OH, —NH$_2$ and —F. The pore modifying group is covalently bound to a linker (when present) or the metal binding group (unless the metal binding group is also the pore modifying group).

The linker is optional. The linker, when present, covalently links a metal binding group and a pore modifying group. The linker is typically between 1 and 6 atoms in length (e.g. C$_{1-6}$-alkyl). The linker covalently bonds 1, 2, 3 or 4 metal binding groups and/or 1, 2, 3 or 4 pore modifying groups.

In some embodiments, the pore surface modifying agent is of the form:

MBG-L-PMG wherein
MBG represents a metal binding group,
L is optional and represents a linker, and
PMG represents a pore modifying group.

In some embodiments, the linker is a divalent linear C$_{1-6}$-alkyl (e.g. C$_1$-alkyl, C$_2$-alkyl, C$_3$-alkyl, C$_4$-alkyl, C$_5$-alkyl or C$_6$-alkyl) bound at one end to the MBG and the other end to the PMG.

In some embodiments, the MBG comprises an amine, such as —NH$_2$.

In some embodiments, the PMG comprises a conjugated n-system, for example a conjugated alkene or alkyne system or an aromatic system, such as phenyl, substituted phenyl, pyridine, 1-naphthylamine, bipyridines including 2,2'-bipyridine, 2,3'-bipyridine, 2,4'-bipyridine, 3,3'-bipyridine, 3,4'-bipyridine and 4,4'-bipyridine. In some embodiments the PMG comprises an amine, such as —NH$_2$.

In some embodiments, the pore surface modifying agent comprises an amine and an aromatic group, such as phenyl. In some embodiments, the pore surface modifying agent is or comprises a diamine (e.g. ethylene diamine (H$_2$NCH$_2$CH$_2$NH$_2$)), which may be useful for applications involving CO$_2$ sorption. In some embodiments, the pore surface modifying agent comprises 2, 3, 4, 5, 6, 7 or 8 conjugated n-bonds, or an aromatic system (such as phenyl, substituted phenyl, pyridine, 1-naphthylamine, bipyridines including 2,2'-bipyridine, 2,3'-bipyridine, 2,4'-bipyridine, 3,3'-bipyridine, 3,4'-bipyridine or 4,4'-bipyridine), which may be useful for applications involving H$_2$ sorption.

In some embodiments, the pore surface modifying agent is selected from ethylene diamine (H$_2$NCH$_2$CH$_2$NH$_2$), mono, poly or perfluoroC$_{1-10}$alkylamine (e.g. CF$_3$(CF$_2$)$_2$NH$_2$, tetrahydrofuran, thiophene, ammonia and pyridine).

In the post-synthetically modified materials, the metal binding group binds to a metal of the co-ordination framework comprising complexes of Formula (I), (II), (III) or (IV), holding the pore modifying group in the pore/channel of the framework (e.g. on the surface of the pore or protruding into the pore/channel).

Accordingly, in another aspect, the present invention provides a co-ordination framework comprising complexes of Formula (I), (II), (III) or (IV), incorporating pore surface modifying agent co-ordinated within the framework. Without wishing to be bound by theory, it is believed that the metal binding group binds (e.g. ligates) to bare metal sites in the cubic vacancy materials, or to both/either bare metal sites and pillaring Cu sites in the Hoffman type materials.

In another aspect, the present invention provides a method of modifying a co-ordination framework comprising complexes of Formula (I), (II), (III) or (IV), comprising contacting a co-ordination framework comprising complexes of Formula (I), (II), (III) or (IV) with a pore surface modifying agent such that the pore surface modifying agent becomes co-ordinated within the framework. In some embodiments, the pore surface modifying agent is competitive and will bind with metal sites without desolvation (e.g. desorption of water). Such embodiments will typically depend on the ligand field strength of the relevant pore surface modifying agent. In other embodiments, the co-ordination framework comprising complexes of Formula (I), (II), (III) or (IV) is at least partially desolvated before contacting the co-ordination framework comprising complexes of Formula (I), (II), (III) or (IV) with the pore surface modifying agent to facilitate the co-ordination of the pore surface modifying agent within the framework.

The co-ordination framework may be desolvated or partially desolvated by any means that removes at least some solvate from the framework to provide a framework having at least some bare metal sites. In some embodiments, the co-ordination framework is desolvated by heating the framework. In some embodiments, the co-ordination framework is desolvated by subjecting the framework to reduced pressure (e.g. a vacuum or at least less than atmospheric pressure). In some embodiments, the co-ordination framework is desolvated by heating the framework under reduced pressure.

The at least partially desolvated co-ordination framework may be contacted with the pore surface modifying agent by any means which allows the pore surface modifying agent to enter the framework and co-ordinate with a metal in the framework. When the pore surface modifying agent is a volatile compound the at least partially desolvated co-ordination framework may be contacted with the pore surface modifying agent in gaseous form by exposing the framework to an atmosphere of the pore surface modifying agent. When the pore surface modifying agent is a liquid, the at least partially desolvated co-ordination framework may be contacted with the pore surface modifying agent in liquid form.

The post-synthetic modification allows for several new tunable properties including:
1. Catalytic processes/catalytic chemical reactions
2. Chemical separations of two or more species from each other
3. Purification of substrates
4. Storage of different gaseous species with high selectivity
5. Tunable redox activity leading to these materials being able to be used as semiconductors in transistors
6. Conductive/semi-conductive substrates for energy transfer
7. Conductive/semi-conductive substrates for ion transfer
8. Conductive/semi-conductive substrates for electron transfer
9. Tunable thermal expansion
10. Tunable thermal resistivity These properties can be made selective or tunable for different contexts depending on the type of post-synthetic modification. In this sense, the co-ordination frameworks comprising complexes of Formulas (I), (II), (III) or (IV) described above act as platforms for a whole series of properties, e.g. different chemical reactions or processes that would not otherwise be possible in the same efficiency (i.e. the efficiency can be improved by PSM).

Some examples of post-synthetic-modifications (PSM) leading to changed/increased desirable properties are given below. The ligand ethylenediamine (en) may be added to frameworks using the above described methods whereby a non-desorbed framework sample is exposed to ethylenediamine at a temperature that increases the volatility of ethylenediamine but below a temperature that decays the framework.

The reaction can be monitored using solid state Ultra-Violet-visible-Near-Infrared (UV-vis-NIR) spectrometry to monitor completion of a colour change associated with ethylenediamine binding to metal sites. The way that en binds within the framework is such that only one end of the molecule binds, leaving the other "dangling" in the void space. The unbound end of the en molecule has an amine group ($-NH_2$). This group has a strong affinity for the gases $CO_2$ and CO. By binding en into the framework, the PSM-framework is typically bestowed increased $CO_2$ affinity as determined by isosteric heat of adsorption. This PSM method may increase the gas sorption functionality of the material.

Different pore surface modifying agents have different relationships to other molecules through chemical and/or steric interactions. A pore surface modifying agent may be selected or designed to achieve certain binding properties using known structure-binding relationships. By incorporating such pore surface modifying agents within an ordered framework structure, it is possible to enhance the binding properties of the relevant framework. Without wishing to be bound by theory, it is believed that one advantage of incorporating ligands into a framework comprising complexes of Formula (I), (II), (III) or (IV) versus simply using the pore surface modifying agents by themselves is the multiple order of magnitude increase in density achieved as the framework, through its high crystalline nature, orders atoms at long range providing highly ordered channels. Such long range highly ordered channels can facilitate reactions occurring at much faster rates, and ions and gases can be stored with greater affinity.

Energy Storage (e.g. Battery) and Semiconductor Applications

The co-ordination frameworks comprising complexes of Formula (I), (II), (III) or (IV), and post-synthetically modified frameworks, are typically redox active and porous. In some embodiments, the frameworks are semi-conducting. The redox active frameworks can act as energy storage devices (e.g. batteries) with high cycles (e.g. upwards of 2000 charges and theoretically upwards of 50000 charges) without appreciable loss of crystallinity or performance (e.g. greater than 90% retention of capacity). Thus, these frameworks can act as devices to hold and transfer ions (e.g. electrons) and energy carrying gases (e.g. $H_2$, $O_2$ and $CH_4$), on demand, without appreciable loss of crystallinity or performance.

Accordingly, in another aspect, the invention provides an energy storage device (e.g. a battery or storage for an energy carrying gas) comprising a co-ordination framework of the present invention, or a post-synthetically modified co-ordination framework of the present invention. In another aspect, the invention provides the use of a co-ordination framework of the present invention, or a post-synthetically modified co-ordination framework of the present invention, in an energy storage device (e.g. a battery or storage for an energy carrying gas).

The co-ordination frameworks of the present invention, and post-synthetically modified co-ordination frameworks of the present invention, may be used in tunable lightweight, high cyclability batteries or energy storage devices for the transport industry including electric/hybrid: cars, drones, passenger and cargo jets, motorcycles, trucks, trains, unmanned vehicles, autonomous vehicles (both land, water and flying), robots, spaceships.

The batteries or energy storage devices may also be utilised as a domestic or industrial power storage unit—providing the grid or houses with peak load capacity, or capacity during brown or blackouts. The batteries could be used to facilitate power efficiency measure in large industrial buildings/skyscrapers, and to regulate and increase the evenness of electricity distribution in smart cities, through the enablement of smart grids.

The batteries or energy storage devices may also be utilised in electronic devices (phones, tablets, laptops other portable devices with screens and/or communication capabilities) as well as satellites and space craft.

These batteries or energy storage devices may be utilised for any device which requires a power source (e.g. stored or on demand power).

In some embodiments, the co-ordination frameworks of the present invention are comprised of at least 90% complexes of Formula (I), Formula (II), Formula (III) and/or Formula (IV) (e.g. at least 95%, at least 97%, at least 98%, at least 99%, at least 99.5%, at least 99.8%, at least 99.9%, at least 99.95% or at least 99.99%). In some embodiments, the co-ordination frameworks of the present invention are comprised of at least 90% complexes of Formula (I) (e.g. at least 95%, at least 97%, at least 98%, at least 99%, at least 99.5%, at least 99.8%, at least 99.9%, at least 99.95% or at least 99.99%). In some embodiments, the co-ordination frameworks of the present invention are comprised of at least 90% complexes of Formula (II) (e.g. at least 95%, at least 97%, at least 98%, at least 99%, at least 99.5%, at least 99.8%, at least 99.9%, at least 99.95% or at least 99.99%). In some embodiments, the co-ordination frameworks of the present invention are comprised of at least 90% complexes of Formula (III) (e.g. at least 95%, at least 97%, at least 98%, at least 99%, at least 99.5%, at least 99.8%, at least 99.9%, at least 99.95% or at least 99.99%). In some embodiments, the co-ordination frameworks of the present invention are comprised of at least 90% complexes of Formula (IV) (e.g. at least 95%, at least 97%, at least 98%, at least 99%, at least 99.5%, at least 99.8%, at least 99.9%, at least 99.95% or at least 99.99%).

In some embodiments, the co-ordination frameworks of the present invention are post-synthetically modified to controllably vary the thermal expansion, redox/electronic, porosity, surface chemistry, gas sorption, ion sorption and/or solvent separation properties.

In some embodiments, the present invention provides: an energy storage device (including Group I, II and III ion storage devices), an $H_2$ gas storage device, an organic hydrocarbon (e.g. $CH_4$, $C_2H_2$, $C_2H_4$, $C_2H_6$) gas storage device, or a low molecular weight gas (e.g. $O_2$ and $CO_2$) gas capture device; the device comprising a co-ordination framework of the present invention (including post-synthetically modified derivatives thereof).

In some embodiments, the present invention provides: a Zero Thermal Expansion material, a Negative Thermal Expansion material or a low Positive Thermal Expansion material, the material comprising a co-ordination framework of the present invention (including post-synthetically modified derivatives thereof). In some embodiments, the expansion behaviour of the material is tuned by type and quantity of ions in the pores.

In some embodiments, the present invention provides a microporous material that can be used for gas and solvent sorption and separation, the material comprising a co-ordination framework of the present invention (including post-synthetically modified derivatives thereof).

EXAMPLES

The present invention is further described below by reference to the following non-limiting Examples.

Example 1—$M^{II}_2[Fe^{II}(CN)_6]$ and $M^{II}_2[Ru^{II}(CN)_6]$

1 Bulk Powder Synthesis of $M^{II}_2[Fe^I (CN)_6]$ and $M^{II}_2[Ru^{II} (CN) 6]$ High crystallinity powders of $M^{II}_2[Fe^{II}(CN)_6]$ and $M^{II}_2[Ru^{II}(CN)_6]$ (wherein M=Fe, Co, Ni and Cu) were grown in H-cells using a two component stoichiometric slow diffusion method. 50 and 100 mL H-cells used in the syntheses were custom made by joining two test tubes using a cylindrical tube of similar diameter as the horizontal join. A schematic representation of the H-cell is shown in FIG. 3.

In the H-cell two component stoichiometric slow diffusion method described herein, metal (II) salts (M=Fe, Co, Ni, Ru and Cu) were dissolved in water in one side of an H-cell, whilst $K_4[Fe^{II}(CN)_6]$ or $K_4[Ru^{II}(CN)_6]$ were dissolved in water in the other side of the H-cell. Over a period of about 3 weeks, bulk powders of $M^{II}_2[Fe^{II}(CN)_6]$ or $M^{II}_2[Ru^{II}(CN)_6]$ (wherein M=Fe, Co, Ni, Ru and Cu) respectively, were formed in the bridge of the H-cell. These bulk powders exhibited high crystallinity, as assessed by powder XRD.

In order to vary the $K^+$ loading within the framework (i.e. vary x in the Formula $K_{(2-x)}[M_xFe^{II}(CN)_6]$ or $K_{(2-x)}[M_xRu^{II}(CN)_6]$), the water in the side of the H-cell containing the $K_4[Fe^{II}(CN)_6]$ or $K_4[Ru^{II}(CN)_6]$ was replaced with aqueous KCl solutions of varying concentrations. Similar materials loaded with $Li^+$ and $Na^+$ were also prepared in an analogous manner using aqueous solutions comprising $Li^+$ and $Na^+$ salts (e.g. LiCl and NaCl) in place of the KCl solution.

A range of materials were prepared as bulk crystalline powders (using the H-cell two component stoichiometric slow diffusion method) and subject to electrochemical, gas sorption, TGA, PXRD and VT PXRD measurements, and gas sorption measurements. A selection of these experiments and results are described below.

1.1 Characterisation 1.1.1 Powder X-Ray Diffraction (PXRD)

Powder X-ray diffraction (PXRD) patterns were collected on a PANalytical X'Pert PRO MPD diffractometer with Cu-Kα1 (1.5406 Å) radiation and equipped with an Oxford Cryostream 700. The application software was X'Pert Data Collector v2.2f [X'Pert Data Collector Version 2.2F; PANAlytical B.V.: Almelo, The Netherlands, 2010], and the instrument control software was XPERT-PRO v1.9E [XPERT-PRO Version 1.9E; PANAlytical B.V.: Almelo, The Netherlands, 2008]. Samples were packed in glass capillaries that were mounted and aligned on a goniometer, which was set to spin within the incident X-ray beam. Data were collected in the 2θ range of 7.5-55° with a step size of 0.013°. Simulated powder diffraction patterns were created using single crystal data from the Cambridge Crystallographic Data Centre within the program Mercury [Mercury 1.4.2; Cambridge Crystallographic Data Centre, 2001].

For variable temperature (VT) studies of NTE, PXRD patterns were obtained at 50 K intervals over the range 100-500 K using the Oxford Cryostream 700 attachment. As for the single runs, data were collected with a 2θ range of 7.5-55° and a step size of 0.013°. High temperature VT studies to determine thermal stability and decomposition temperatures were undertaken in the range 300-673 K, using the PANalytical X'Pert PRO MPD furnace attachment.

VT PXRD patterns were also obtained using the powder function of a Cu lab source Rigaku-Agilent SuperNova single crystal diffractometer using a large Atlas area detector. VT data was collected using an Oxford Cryostream 700 Plus attachment. High resolution synchrotron VT PXRD patterns were obtained at 20 K intervals over the range 100-500 K at the Australian Synchrotron (0.7524 Å) and at the Advanced Photon Source (0.7291 Å) using an Oxford Cryostream.

1.1.2 Solid State UV/Vis/NIR

UV/Vis/NIR spectra were recorded using a CARY 5E UV/Vis/NIR spectrophotometer with an Omni Diff Probe attachment interfaced to Varian WinUV software. Solid state samples were mounted onto high density filter paper onto which the Omni Diff Probe was placed. Two measurements were recorded per sample and averaged to reduce noise.

1.1.3 FTIR Spectroscopy

FTIR spectra were recorded using a Bruker IFS 66v FTIR with a Single Bounce Diamond/KRS-5 Attenuated Total Reflection (ATR) Accessory. A minimum amount of crystalline powder was placed in close contact with the crystal interface and scanned from 360-4500 cm$^{-1}$. All measurements were undertaken in a dry dinitrogen atmosphere. Two spectra were recorded per sample and averaged to reduce noise due to background interference.

1.1.4 Raman Spectroscopy

Raman studies were performed on a Renishaw Raman inVia Reflex (automated microscope) with 1-5 μm spatial resolution operating 488, 514 and 633 nm lasers. Variable temperature Raman was conducted using the Linkam VT Sample Cell linked to a fast-ramp temperature control unit attachment on the Renishaw Raman inVia Reflex.

1.1.5 Solid State Electrochemistry

Electrochemical measurements were performed under argon using a Bioanalytical Systems BAS 100A Electrochemical Analyser. Cyclic and square wave voltammograms were recorded under argon in 0.1 M [(n-C$_4$H$_9$)$_4$N]PF$_6$ dissolved in anhydrous CH$_3$CN at 25° C. using a glassy carbon working electrode, a platinum wire auxiliary electrode and an Ag/Ag$^+$ wire quasi reference electrode. Solid state samples were mounted on the glassy carbon working electrode by dipping the electrode in the powder sample dispersed in a minimum of acetone and securing it with Nafion. A scan of the carbon working electrode with Nafion was obtained to provide a background reference. Nafion exhibits a peak at −0.5 mV versus the ferrocene/ferrocenium couple) (Fc$^+$/Fc$^0$. Ferrocene was added as an internal standard on completion of each experiment. The ferrocene/ferrocenium couple)(Fc$^+$/Fc$^0$ occurred at +250 mV vs Ag/Ag$^+$ and potentials are quoted in mV versus Fc$^+$/Fc$^0$ [Connelly, N. G.; Geiger, W. E. Chemical Reviews 1996, 96, 877].

1.1.6 Adsorption Isotherm and Porosity Measurement

The adsorption isotherm measurement was performed using an Accelerated Surface Area & Porosimetry System (ASAP) 2020 supplied by Micromeritics Instruments Inc. The sample was placed in a pre-weighed sample tube with a Transeal cap to prevent intrusion of atmospheric gas during transfer and weighing. The sample was desolvated at 170° C. under high vacuum for 12 hr. The mass of the degassed sample was measured and the evacuated sample tube was transferred to the analysis port of the instrument. The warm and cold free space corrections were obtained using high purity helium gas. The hydrogen and nitrogen adsorption and desorption isotherms were subsequently measured at 77 K. The data were analysed using BET [Brunauer, S.; Emmett, P. H.; Teller, E. Journal of the American Chemical Society 1938, 60, 309] models to determine the surface area.

The heat of adsorption for hydrogen was determined by comparing hydrogen isotherms at 77 and 87 K. Powder X-ray diffraction was undertaken for all samples after every measurement to ensure the materials had retained crystallinity. Isosteric heat of adsorption calculations $Q_{st}$ for $H_2$ at 77 and 87 K were undertaken using the Clausius-Clapeyron equation (Equation 1) [Demessence, A.; D'Alessandro, D. M.; Foo, M. L.; Long, J. R. Journal of the American Chemical Society 2009, 131, 8784]:

$$(\ln P)_n = -\left(\frac{Q_{st}}{R}\right)\left(\frac{1}{T}\right) + C \qquad \text{Equation 1}$$

Where P is the pressure, n is the amount adsorbed, T is the temperature, R is the universal gas constant and C is a constant. The isosteric heat of adsorption $Q_{st}$ was subsequently obtained from the following modified Equation 2:

$$Q_{st} = -R\left(\frac{\ln P_2 - \ln P_1}{\frac{1}{T_2} - \frac{1}{T_1}}\right) \qquad \text{Equation 2}$$

1.2 Exemplary Co-Ordination Frameworks

The following exemplary Co-ordination Frameworks 1 to 8 were made by the process described above using the reagents and quantities specified in the below tables.

| Co-ordination Framework 1 | | | |
|---|---|---|---|
| Two Component Slow Diffusion in H-Cell Diffusion Start Date: 7$^{th}$ Nov. 2015 | | Mass/Volume | Moles |
| Reactant 1 | K$_4$[Ru$^{II}$(CN)$_6$] (FW: 413 g/mol) | m = 34 mg | 0.082 mmol |
| Reaction 2 | Ni$^{II}$(CH$_3$CH$_2$COO)$_2$•4H$_2$O (FW: 249 mmol) | m = 40 mg | 0.16 mmol |
| Solvent | H$_2$O | V = 100 mL | |
| Framework formed in HCell 071115 -09 | K$_x$[Ni$_{2-y}$$^{II}$Ru$^{II}$(CN)$_6$] (FW: 374 g/mol) | m = 28.21 mg | Yield = 92% |

| Co-ordination Framework 2 | | | |
|---|---|---|---|
| Two Component Slow Diffusion in H-Cell Diffusion Start Date: 7$^{th}$ Nov. 2015 | | Mass/Volume | Moles |
| Reactant 1 | K$_4$[Ru$^{II}$(CN)$_6$] (FW: 413 g/mol) | m = 33 mg | 0.080 mmol |

-continued

| Co-ordination Framework 2 | | | |
|---|---|---|---|
| Two Component Slow Diffusion in H-Cell Diffusion Start Date: 7$^{th}$ Nov. 2015 | | Mass/Volume | Moles |
| Reaction 2 | $Fe^{II}(SO_4) \cdot 7H_2O$ (FW: 253 g/mol) | m = 39 mg | 0.15 mmol |
| Solvent | $H_2O$ + 10 mg KCl | V = 100 mL | |
| Framework formed in HCell 071115-03 | $K_x[Fe_{2-y}{}^{II}Ru^{II}(CN)_6]$ (FW: 369 g/mol) | m = 24.5 mg | Yield = 83% |

| Co-ordination Framework 3 | | | |
|---|---|---|---|
| Two Component Slow Diffusion in H-Cell Diffusion Start Date: 30$^{th}$ Oct. 2015 | | Mass/Volume | Moles |
| Reactant 1 | $K_4[Ru^{II}(CN)_6]$ (FW: 413 g/mol) | m = 33 mg | 0.080 mmol |
| Reaction 2 | $Co^{II}(CH_3CH_2COO)_2 \cdot 4H_2O$ (FW: 249 g/mol) | m = 46 mg | 0.18 mmol |
| Solvent | $H_2O$ + 5 mg KCl | V = 150 mL | |
| Framework formed in HCell 301015-09 | $K_x[Co_{2-y}{}^{II}Ru^{II}(CN)_6]$ (FW: 375 g/mol) | m = 25.76 mg | Yield = 85% |

| Co-ordination Framework 4 | | | |
|---|---|---|---|
| Two Component Slow Diffusion in H-Cell Diffusion Start Date: 14$^{th}$ May 2015 | | Mass/Volume | Moles |
| Reactant 1 | $K_4[Fe^{II}(CN)_6] \cdot 10H_2O$ (FW: 484 g/mol) | m = 31 mg | 0.064 mmol |
| Reaction 2 | $Co^{II}(CH_3CH_2COO)_2 \cdot 4H_2O$ (FW: 249 g/mol) | m = 39 mg | 0.16 mmol |
| Solvent | $H_2O$ | V = 100 mL | |
| Framework formed in HCell 140515-01A | $K_x[Co_{2-y}{}^{II}Fe^{II}(CN)_6]$ (FW: 330 g/mol) | m = 18.57 mg | Yield = 88% |

| Co-ordination Framework 5 | | | |
|---|---|---|---|
| Two Component Slow Diffusion in H-Cell Diffusion Start Date: 14$^{th}$ May 2015 | | Mass/Volume | Moles |
| Reactant 1 | $K_4[Fe^{II}(CN)_6] \cdot 10H_2O$ (FW: 484 g/mol) | m = 30 mg | 0.062 mmol |
| Reaction 2 | $Fe^{II}(SO_4) \cdot 7H_2O$ (FW: 253 g/mol) | m = 38 mg | 0.15 mmol |
| Solvent | $H_2O$ | V = 100 mL | |
| Framework formed in HCell 140515-01B | $K_x[Fe_{2-y}{}^{II}Fe^{II}(CN)_6]$ (FW: 324 g/mol | m = 17.07 mg | Yield = 85% |

| Co-ordination Framework 6 | | | |
|---|---|---|---|
| Two Component Slow Diffusion in H-Cell Diffusion Start Date: 14$^{th}$ May 2015 | | Mass/Volume | Moles |
| Reactant 1 | $K_4[Fe^{II}(CN)_6] \cdot 10H_2O$ (FW: 484 g/mol) | m = 47 mg | 0.097 mmol |
| Reaction 2 | $Ni^{II}(CH_3CH_2COO)_2 \cdot 4H_2O$ (FW: 249 mmol) | m = 66 mg | 0.26 mmol |

Co-ordination Framework 6

| Two Component Slow Diffusion in H-Cell Diffusion Start Date: 14$^{th}$ May 2015 | | Mass/Volume | Moles |
|---|---|---|---|
| Solvent | $H_2O$ | V = 100 mL | |
| Framework formed in HCell 140515-10B | $K_x[Ni_{2-y}{}^{II}Fe^{II}(CN)_6]$ (FW: 329 g/mol) | m = 29.04 mg | Yield = 91% |

Co-ordination Framework 7

| Two Component Slow Diffusion in H-Cell Diffusion Start Date: 20$^{th}$ Jun. 2014 | | Mass/Volume | Moles |
|---|---|---|---|
| Reactant 1 | $K_4[Fe^{II}(CN)_6] \cdot 10H_2O$ (FW: 484 g/mol) | m = 21 mg | 0.043 mmol |
| Reaction 2 | $Cu^{II}(SO_4) \cdot 5H_2O$ (FW: 249 g/mol) | m = 24 mg | 0.096 mmol |
| Solvent | $H_2O$ | V = 100 mL | |
| Framework formed in HCell 200614-10A | $[Cu_2{}^{II}FeII(CN)_6]$ (FW: 339 g/mol) | m = 14.13 mg | Yield = 97% |

Co-ordination Framework 8

| Two Component Slow Diffusion in H-Cell Diffusion Start Date: 20$^{th}$ Jun. 2014 | | Mass/Volume | Moles |
|---|---|---|---|
| Reactant 1 | $K_4[Ru^{II}(CN)_6]$ (FW: 413 g/mol) | m = 31 mg | 0.075 mmol |
| Reaction 2 | $Cu^{II}(SO_4) \cdot 5H_2O$ (FW: 249 g/mol) | m = 40 mg | 0.16 mmol |
| Solvent | $H_2O$ | V = 100 mL | |
| Framework formed in HCell 200614-09B | $[Cu_2{}^{II}Ru^{II}(CN)_6]$ (FW: 384 g/mol) | m = 27.07 mg | Yield = 94% |

Co-ordination Frameworks 1 to 6 above refer to the variables "x" and "y". In these Frameworks, x and y were not explicitly determined (by, for example, elemental analysis), however, it is estimated that x=2y and y=about 0.1 to about 0.15 for each of co-ordination Frameworks 1 to 6.

Similar processes were also performed using different metal(II) salts (Cr, Mn, Fe, Co, Ni, Zn, Ru and Rh) with lithium, sodium or potassium salts of $[Fe^{II}(CN)_6]^{4-}$ or $[Ru^{II}(CN)_6]^{4-}$ with different concentrations of KCl, NaCl and LiCl to prepare a range of different co-ordination frameworks of Formula (I).

Differences in functionality between $Li^+$, $Na^+$ and $K^+$ loaded samples vary across each function.

Electrochemically, $Na^+$ and $K^+$ show higher cyclability of electrochemical reactions. That is, frameworks loaded with $Na^+$ and $K^+$ and can typically sustain at least 2,000 charge-discharge cycles (and theoretically at least 50,000 charge-discharge cycles), typically with at least 90% capacity retention. Some frameworks loaded with $Li^+$ samples can also sustain at least 2,000 charge-discharge cycles (and theoretically at least 50,000 charge-discharge cycles), however, some $Li^+$ loaded samples were observed to degrade after 1,000 to 5,000 cycles.

$Li^+$, $Na^+$ and $K^+$ loaded samples also vary in thermal expansion properties, with their coefficients of thermal expansion positively correlated with the ionic radii of ion within each family of frameworks. That is, larger ions lead to increase in coefficients of thermal expansion from negative to zero, or zero to low positive.

The porosity and affinity for guests for each framework also varies greatly with different ion incorporation. As the number of ions increases, the pore volume decreases. The ions can have an affinity for certain gases ($H_2$, $O_2$, gases of low molecular weight organic molecules).

Example 2—Post-Synthetic-Modifications

Described below are examples of various Post-Synthetic-Modification (PSM) experiments performed on the fully reduced (i.e. M and M' having an oxidation state of +2) vacant co-ordination frameworks of Formula (I).

Scheme 1 and 2 refer to vacancy Prussian blues (PBs), which are all the materials described with the exception of $Cu^{II}{}_2[Fe^{II}(CN)_6]$ and $Cu^{II}{}_2[Ru^{II}(CN)_6]$. Scheme 3 describes PSM of these copper-based analogues. Scheme 4 is relevant to all materials.

2.1 Scheme 1

Pore surface modifying agents (e.g. $NH_3$, ethylene diamine, pyridine, THF and thiophene) were placed in a sealable large vial. Dry evacuated desolvated high crystallinity powders of the co-ordination frameworks of Formula (I) (with the exception of $[Cu_2Fe(CN)_6]$ and $[Cu_2Ru(CN)_6]$) were placed in a smaller open vial inside the larger vial. The large vial was sealed. The sealed glass vial-in-a-vial setup was placed on a custom built solid-state UV-vis-NIR reflectance spectrometer to monitor the absorbance spectral shift. New low energy bands appear when the N-donor volatile ligands bind to bare metal sites within the pore space of the co-ordination frameworks of Formula (I). Spectroscopic measurements continue every 15 minutes. When this new low energy band appears to be approaching a maximum the power is removed from the setup, evacuated at 1 bar for 1 hour and placed under a stream argon overnight.

Representative example: Ammonia added to $Ni_2Fe(CN)_6$ gives the framework $(Ni_2Fe(CN)_6) \cdot 2NH_3$. The ammonia displaces water or adds to bare metal sites on the Ni. The UV-vis-NIR reveals a low energy band in the 9000 $cm^{-1}$ region. This is believed to indicate the PSM with ammonia has increased the electronic delocalisation of d-orbital electrons across the cyanide bridges, leading to through-framework semi-conductivity. The material was observed to have up to 10% higher $CO_2$ uptake compared to its non-PSM equivalent.

2.2 Scheme 2

Low volatility pore surface modifying agents, were injected into a previously evacuated round bottom flask over dry crystalline desolvated powders of 2,2-PBs.

Representative example: 0.5 mL of pyridine was added to 30 mg of $Ni_2Ru(CN)_6$ using this method. The material immediately changed colour by inspection (qualitative) and was deemed to have immediately come to completion. This material was observed to have increased $H_2$ uptake and improved thermal stability. Elemental analysis shows empirical formula $Ni_2Ru(CN)_6 \cdot 0.75$(pyridine)

2.3 Scheme 3

Cu, Ag and Au based analogues do not form vacancy type-2,2-PB morphologies. Rather, they distort along the Jahn Teller axis of half of the Cu, Ag or Au in the framework forming a structure similar to a pillared-Hofmann-type MOF (metal organic framework). The pillared Cu, Ag or Au has four water around it. These waters can be displaced using N- and O-donor ligands during the volatile method described in Scheme 1.

The main difference in desolvation between pillared Cu, Ag or Au structures and the vacancy type-2,2-PB morphologies is that the pillared Cu, Ag or Au framework was not fully evacuated before PSM ligand displacement, rather it was dried under dynamic vacuum without full desolvation. Again, UV-vis-NIR spectroscopy was used to monitor the readiness of the framework to be exposed to a ligand such as a pore surface modifying agent.

Representative example: Ammonia added to $Cu_2Fe(CN)_6$ gave the framework $(Cu(NH_3)_4)(Cu(NH_3)_2Fe(CN)_6)$ with very high conversion (near 100%). The ammonia displaces water or adds to bare metal sites on the Cu. The The UV-vis-NIR reveals a low energy band in the 9000 $cm^{-1}$ region. This is believed to indicate the PSM with ammonia has increased the electronic delocalisation of d-orbital electrons across the cyanide bridges, leading to through-framework semi-conductivity. The material was also observed to have up to 50% higher $CO_2$ uptake compared to its non-PSM equivalent.

2.4 Scheme 4

Lower volatility pore surface modifying agents (e.g. pyridine and thiophene) were diffused as gases into the pore space of a range of co-ordination frameworks of Formula (I), (II), (III) and (IV) by placing the vial-in-a-vial setup in a heat mantle sleeve which could be used simultaneously with the solid state UV-vis-NIR reflectance spectrometer. The temperature of the vial-in-a-vial setup was increased by 1° C. per minute until the ligand was evolved as observed as a colour change recorded quantitatively using the UV-vis-NIR spectrometer—shown as the appearance and disappearance of bands at different wavelengths.

2.5 Scheme 5

A note on ligands. Over 60 mono, bi, tri and tetra-dentate N- and O-donor ligands were tested on a range of co-ordination frameworks of Formula (I), (II), (III) and (IV). X-ray diffractometry was undertaken on the new materials wherein it was determined that they were still crystalline and that their structure had not significantly changed morphology.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A co-ordination framework comprising complexes of Formula (II)

$$A_x(M_2[M'(CN)_6]) \quad (II)$$

Formula (II)
wherein
A is selected from $Li^+$, $Na^+$ and $K^+$, $0<x\leq8$, and A is located in the pores of the framework;
M is selected from V, Cr, Mn, Fe, Co, Ni, Zn, Ru, Rh, Pd and Pt and the framework has a face-centred cubic Fm$\overline{3}$m structure; or
M is selected from Cu, Ag and Au and the framework has a tetragonal P4/mmm structure; and
M' is selected from Fe and Ru;
wherein the co-ordination framework is desolvated; and when M' is Ru, the framework exhibits zero or negative thermal expansion over a temperature range of 0 to 700 K;
provided that when and M' is Fe, M is not Mn, Co, Ni, Cu or Fe, and
wherein the framework of Formula (II) is prepared by initially preparing the framework in the M+2/M'+2 oxidation state, by contacting a first aqueous solution comprising an $M^{2+}$ion with a second aqueous solution comprising a lithium, sodium or potassium salt of $[Fe^{II}(CN)_6]^{4-}$or $[Ru^{II}(CN)_6]^{4-}$ under conditions which maintain a diffusion zone between the first aqueous solution and the second aqueous solution for a time of in excess of 1 day thereby forming a precipitate or suspension in the diffusion zone;
and then subjecting the co-ordination framework to further manipulation to construct the framework of Formula (II).

2. A co-ordination framework according to claim 1, wherein M is selected from Cr, Mn, Fe, Co, Ni, Cu, Zn, Ru and Rh.

3. A co-ordination framework according to claim 1, wherein one of the following applies:
 i) M is in the +2 oxidation state;
 ii) M is in the +3 oxidation state.

4. A co-ordination framework according to claim 1, wherein one of the following applies:
 i) M' is in the +2 oxidation state; or
 ii) M' is in the +3 oxidation state.

5. A co-ordination framework according to claim 1, wherein M is Cu.

6. A co-ordination framework according to claim 1, wherein one or more M or $[M'(CN)_6]$ groups and/or $M_2[M'(CN)_6]$ complexes are absent from the framework.

7. A co-ordination framework according to claim 1, wherein the co-ordination framework further comprises a pore surface modifying agent.

8. A method of preparing a co-ordination framework comprising complexes of Formula (IV)

$$A_x(M_2[M'(CN)_6]) \quad (IV)$$

Formula (IV)
wherein A is selected from $Li^+$, $Na^+$ and $K^+$, M is selected from V, Cr, Mn, Fe, Co, Ni, Cu, Ag, Au, Zn, Ru, Rh, Pd and Pt, M' is selected from Fe and Ru, $0<x\leq8$, A is located in the pores of the framework; and
wherein the method comprises contacting a first aqueous solution comprising an $M^{2+}$ion with a second aqueous solution comprising a lithium, sodium or potassium salt of [Fe$^{II}$(CN)$_6$]$^{4-}$ or [Ru$^{II}$(CN)$_6$]$^{4-}$ under conditions which maintain a diffusion zone between the first aqueous solution and the second aqueous solution for a time of in excess of 1 day, thereby forming a precipitate or suspension of the co-ordination framework comprising complexes of Formula (IV) in the diffusion zone.

9. The method according to claim 8, wherein M is selected from Cr, Mn, Fe, Co, Ni, Cu, Zn, Ru and Rh.

10. The method according to claim 8, wherein the M$^{2+}$ ion is derived from a salt selected from M(CH$_3$CH$_2$COO)$_2$, M(SO$_4$), a hydrate thereof and a mixture thereof.

11. The method according to claim 8, wherein one or both of the following applies:
   i) more than 95% of M in M$_2$[M'(CN)$_6$] is in the +2 oxidation state; and
   ii) wherein more than 95% of M' in M$_2$[M'(CN)$_6$] is in the +2 oxidation state.

12. The method according to claim 8, wherein the method further comprises isolating the precipitate or suspension of the co-ordination framework comprising complexes of Formula (IV) formed in the diffusion zone.

13. The method according to claim 12, wherein the coordination framework is desolvated.

14. A method of preparing a modified co-ordination framework, the method comprising contacting a co-ordination framework according to claim 1 with a pore surface modifying agent.

15. An energy storage device comprising a co-ordination framework of claim 1.

16. The device of claim 15, wherein the energy storage device is a battery or a gas storage device.

17. The device according to claim 16, wherein the gas storage device is a hydrogen, oxygen or methane gas storage device.

* * * * *